United States Patent
Sawada

(10) Patent No.: US 7,139,589 B2
(45) Date of Patent: Nov. 21, 2006

(54) MOBILE WIRELESS TERMINAL DEVICE

(75) Inventor: Kensuke Sawada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 141 days.

(21) Appl. No.: 11/071,969

(22) Filed: Mar. 4, 2005

(65) Prior Publication Data

US 2005/0148315 A1 Jul. 7, 2005

Related U.S. Application Data

(63) Continuation of application No. PCT/JP03/00951, filed on Jan. 31, 2003.

(51) Int. Cl.
*H04B 1/38* (2006.01)

(52) U.S. Cl. .............. 455/553.1; 455/552.1; 455/426.1; 455/422.1; 370/328

(58) Field of Classification Search ............. 455/403, 455/421, 422.1, 426.1, 436, 517, 456.1, 11.1, 455/13.1, 550.1, 552.1, 553.1; 370/331–332, 370/338, 328, 352
See application file for complete search history.

(56) References Cited

U.S. PATENT DOCUMENTS

| | | | | |
|---|---|---|---|---|
| 6,324,380 | B1 * | 11/2001 | Kiuchi et al. | 455/553.1 |
| 6,804,532 | B1 * | 10/2004 | Moon et al. | 455/552.1 |
| 7,031,723 | B1 * | 4/2006 | Shamoto et al. | 455/456.1 |
| 2001/0018336 | A1 | 8/2001 | Okajima et al. | |
| 2003/0046413 | A1 * | 3/2003 | Sakakura | 709/229 |
| 2003/0214961 | A1 * | 11/2003 | Nevo et al. | 370/401 |

FOREIGN PATENT DOCUMENTS

| | | |
|---|---|---|
| JP | 8-84373 | 3/1996 |
| JP | 9-83528 | 3/1997 |
| JP | 2000-31895 | 1/2000 |
| JP | 2001-086557 | 3/2001 |
| JP | 2001-156787 | 6/2001 |
| JP | 2001-189971 | 7/2001 |

OTHER PUBLICATIONS

International Search Report dated May 20, 2003.

* cited by examiner

*Primary Examiner*—Joseph Feild
*Assistant Examiner*—Kamaran Afshar
(74) *Attorney, Agent, or Firm*—Katten Muchin Rosenman LLP

(57) ABSTRACT

An appearance of other mobile wireless station within a communication area of a second wireless communication system of a main mobile wireless station when the main mobile wireless station is in the communication area of a wireless base station of the first wireless communication system, is automatically detected. Communications with other mobile wireless station are autonomously started by a second wireless communication system and communications with the wireless base station are performed by the first wireless communication system. Communication content from the wireless base station of the first wireless communication system and communication content from the other mobile wireless station of the second wireless communication system are mutually relayed. The relay control is terminated when the other mobile wireless station moves outside the communication area of the second wireless communication system of the main mobile wireless station.

11 Claims, 18 Drawing Sheets

| | WIRELESS SYSTEM A | WIRELESS SYSTEM B |
|---|---|---|
| ADDRESS OF PERIPHERAL TERMINAL | $A_1, A_2, \cdots$ | $B_1, B_2, \cdots$ |

FIG. 16
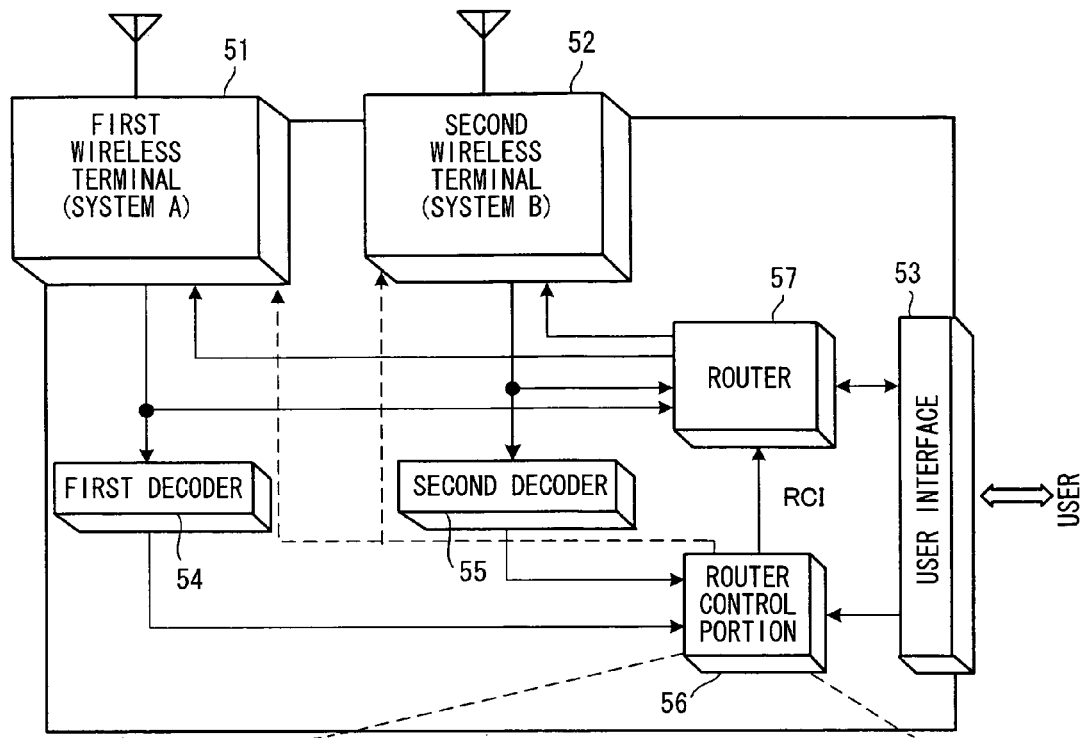
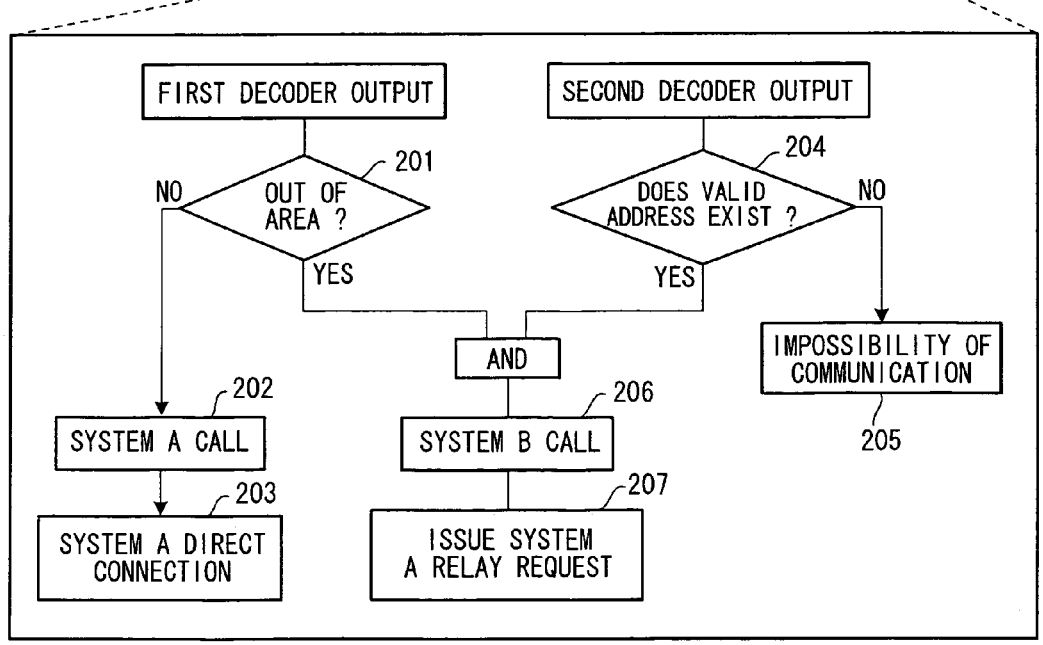

FIG. 17
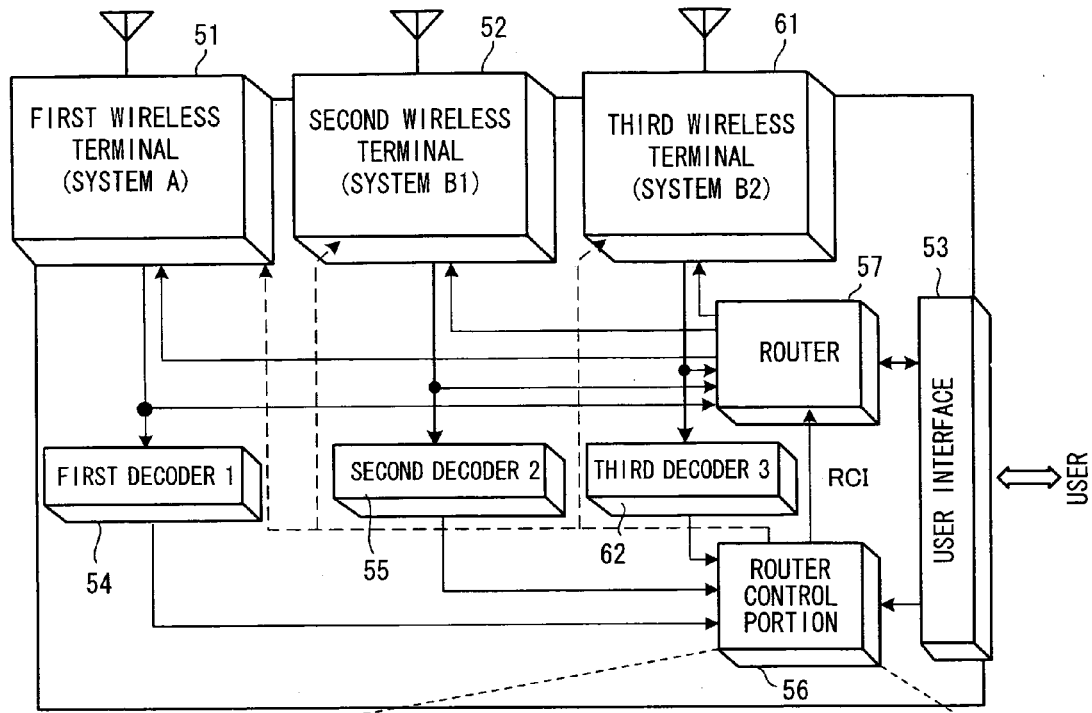
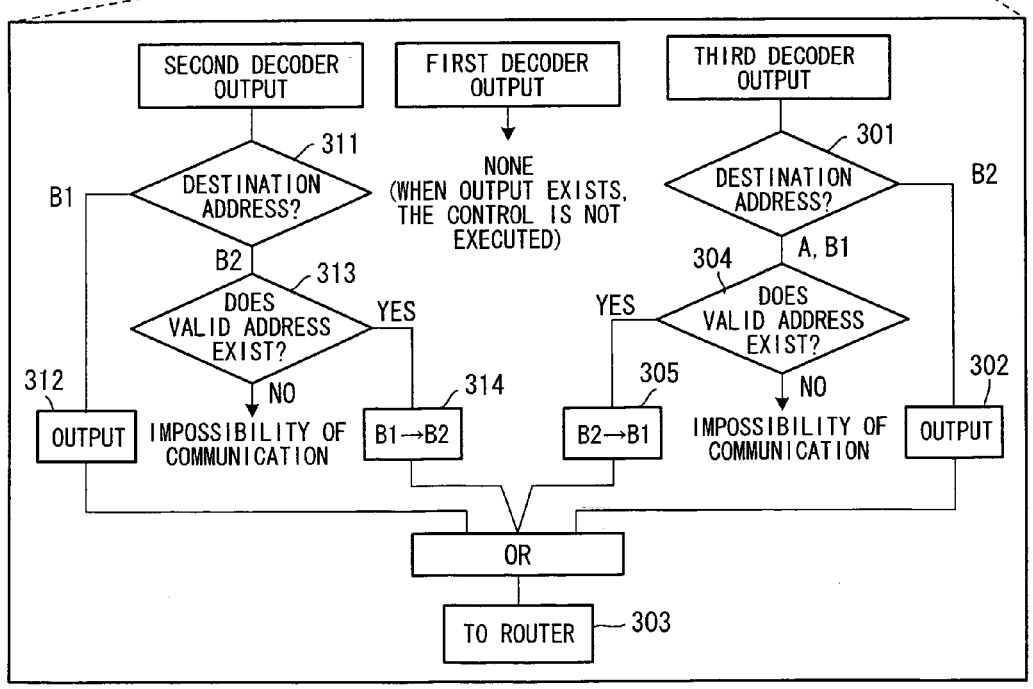

FIG. 18
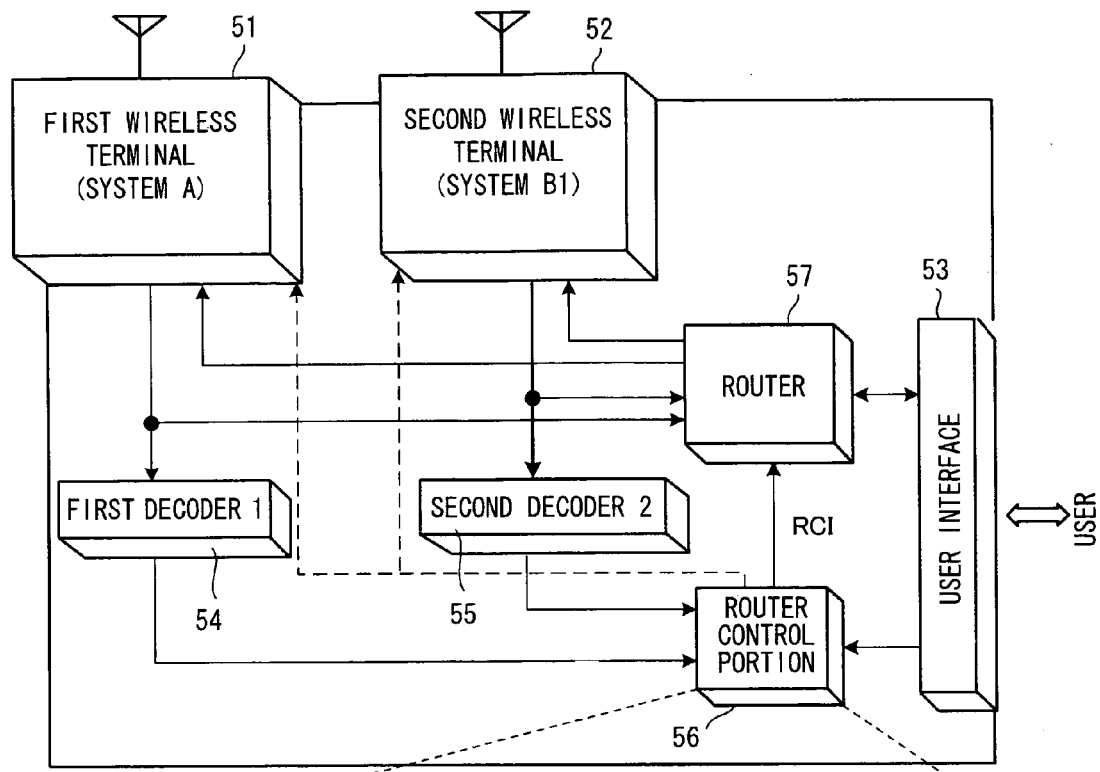
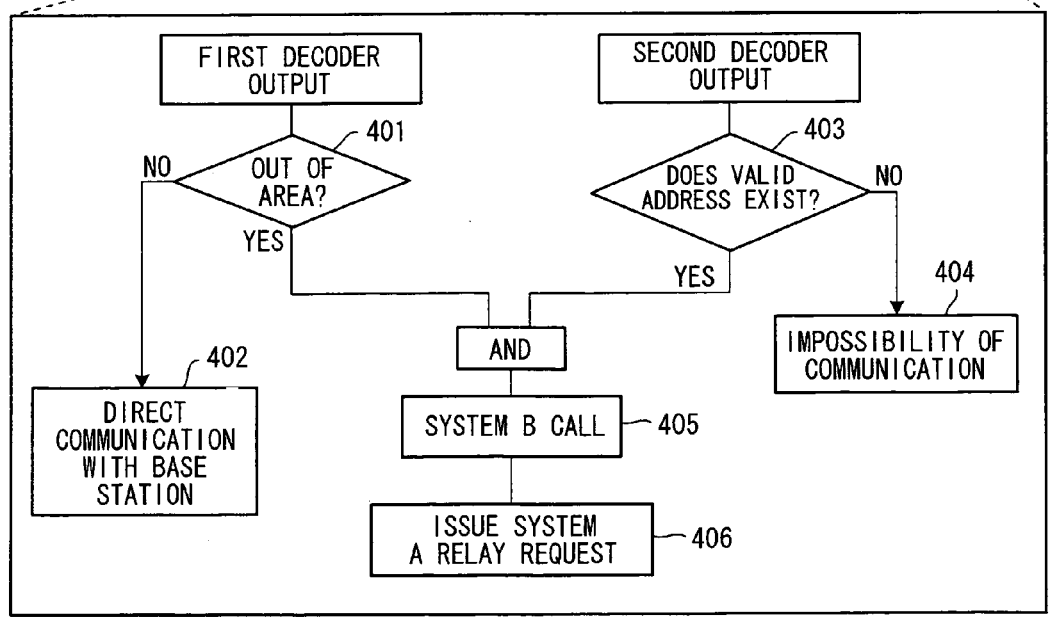

FIG. 19
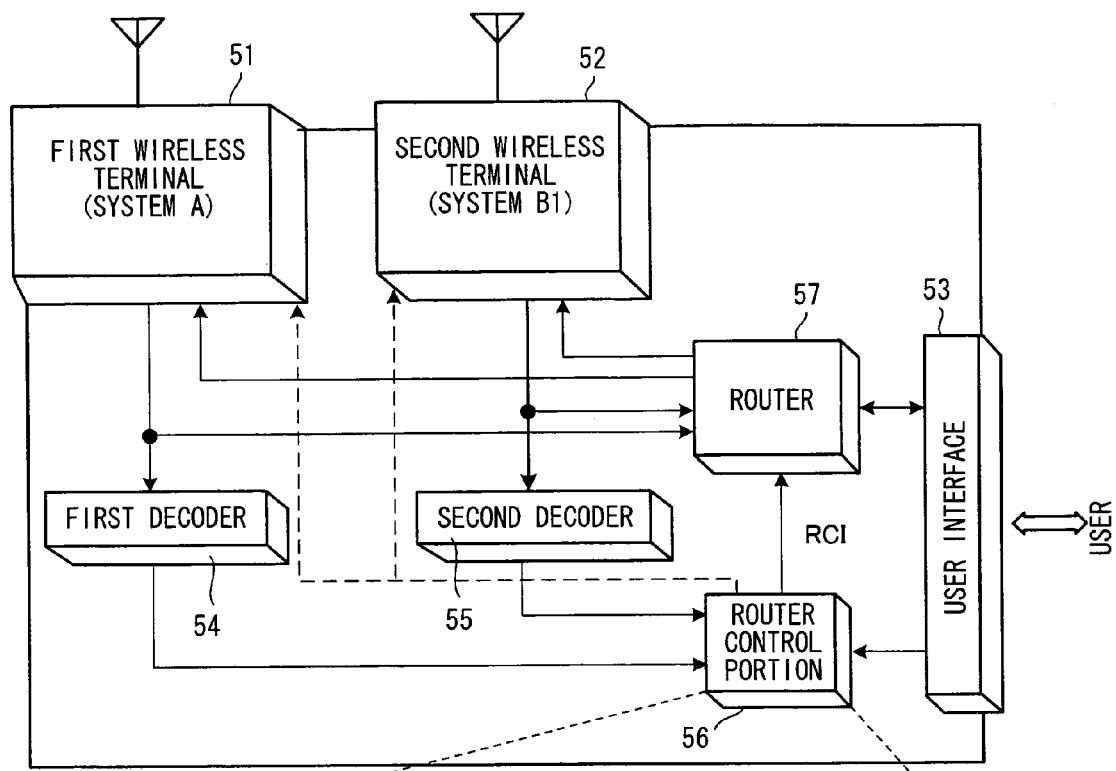
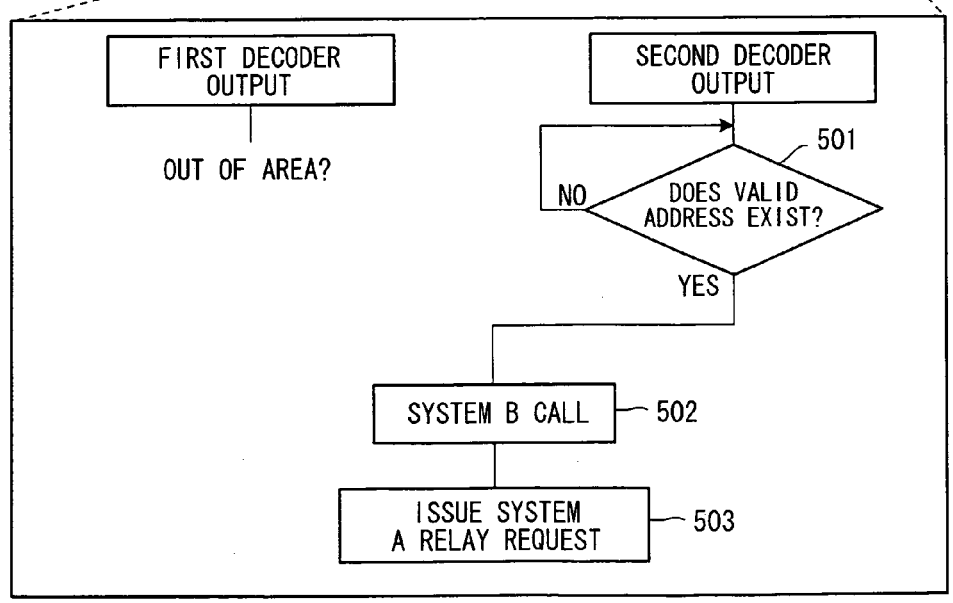

FIG. 20
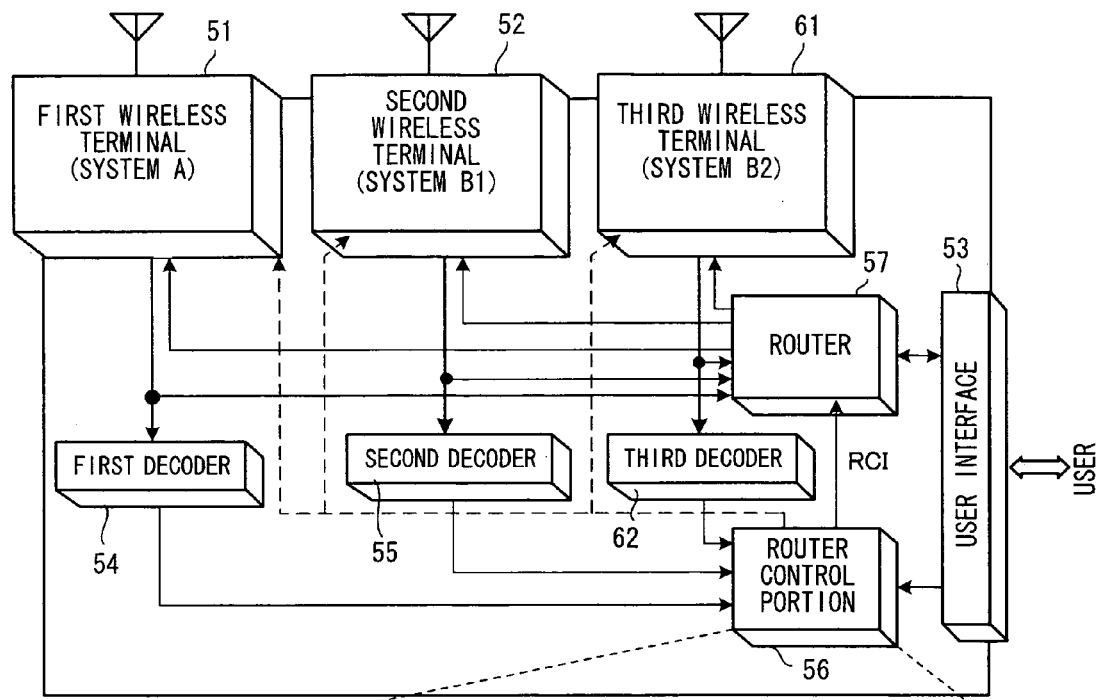
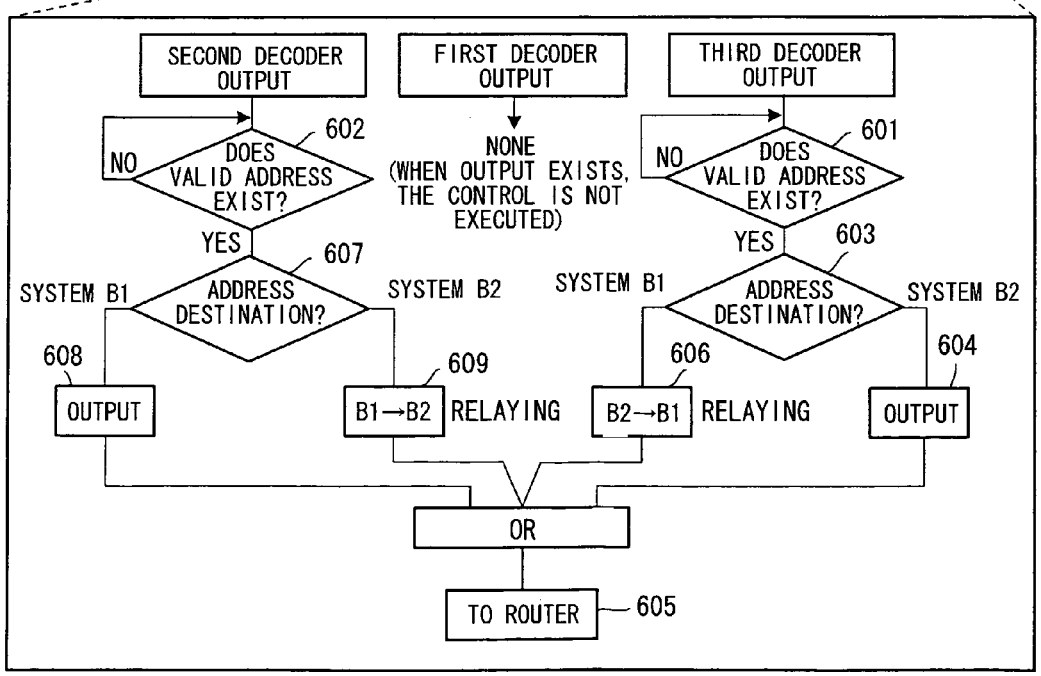

FIG. 21
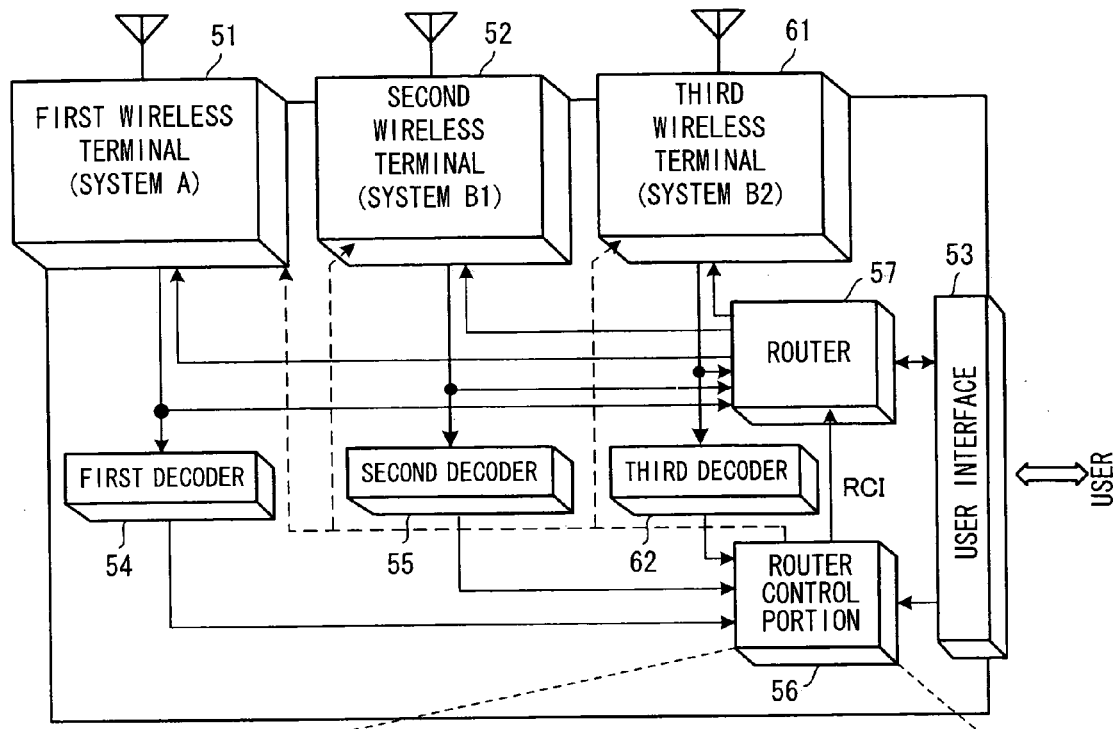
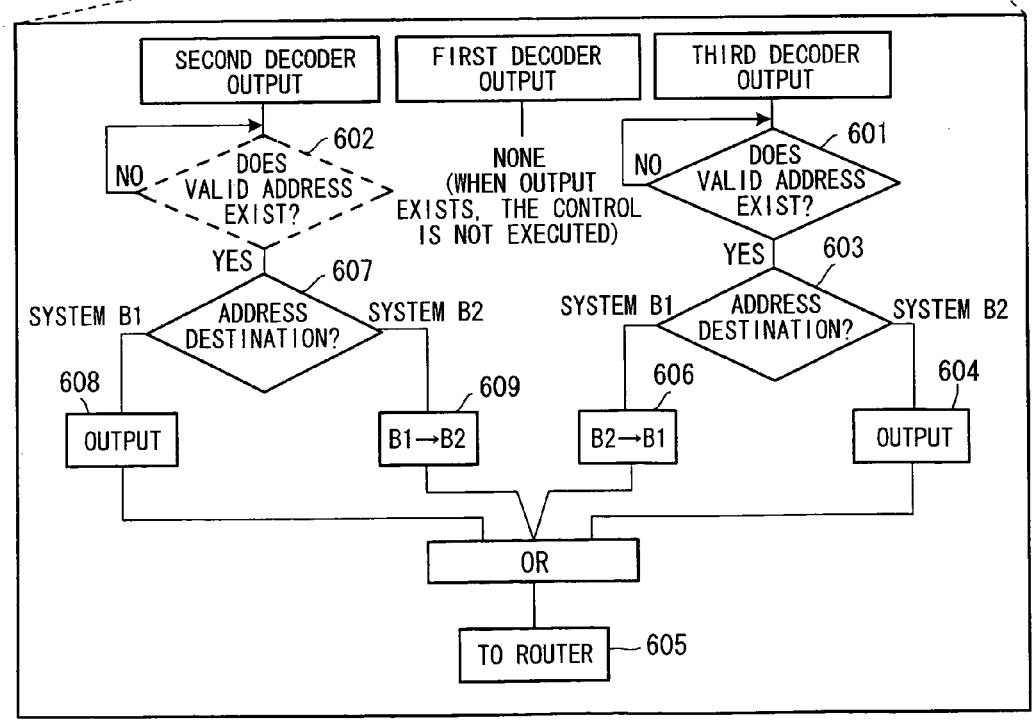

FIG. 23
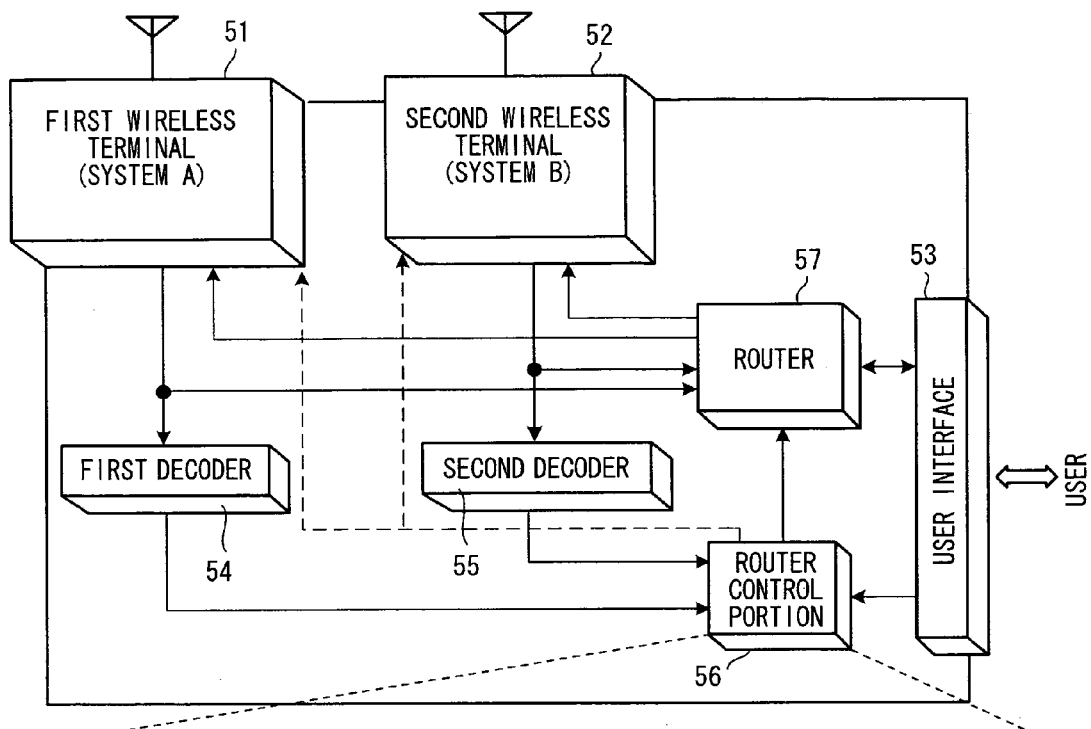
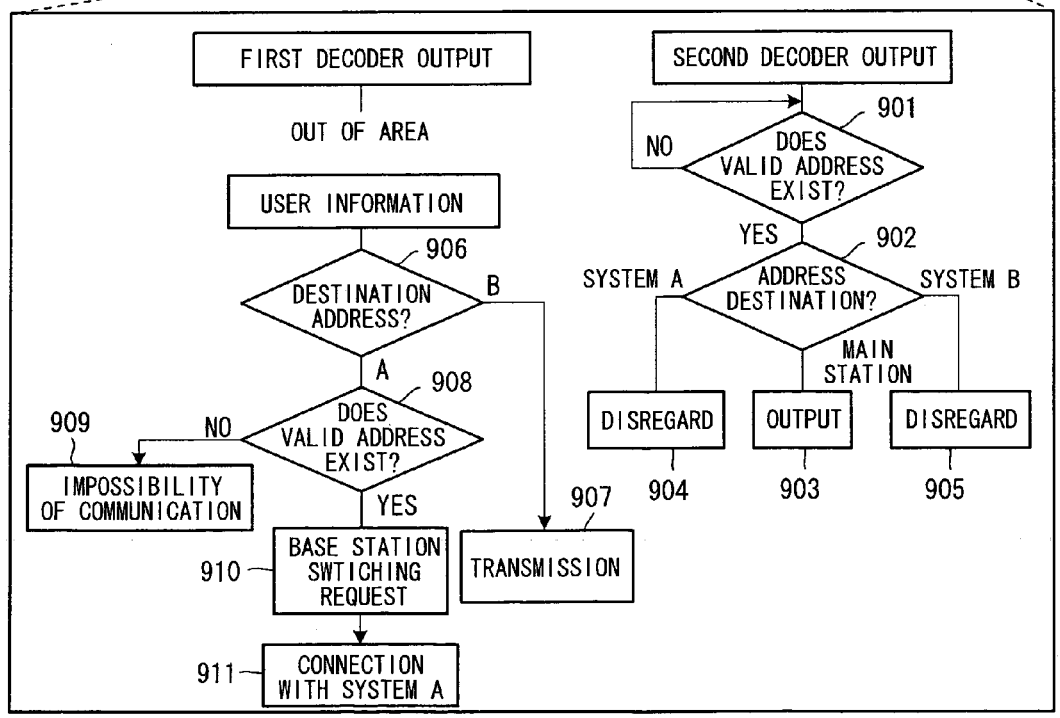

FIG. 24
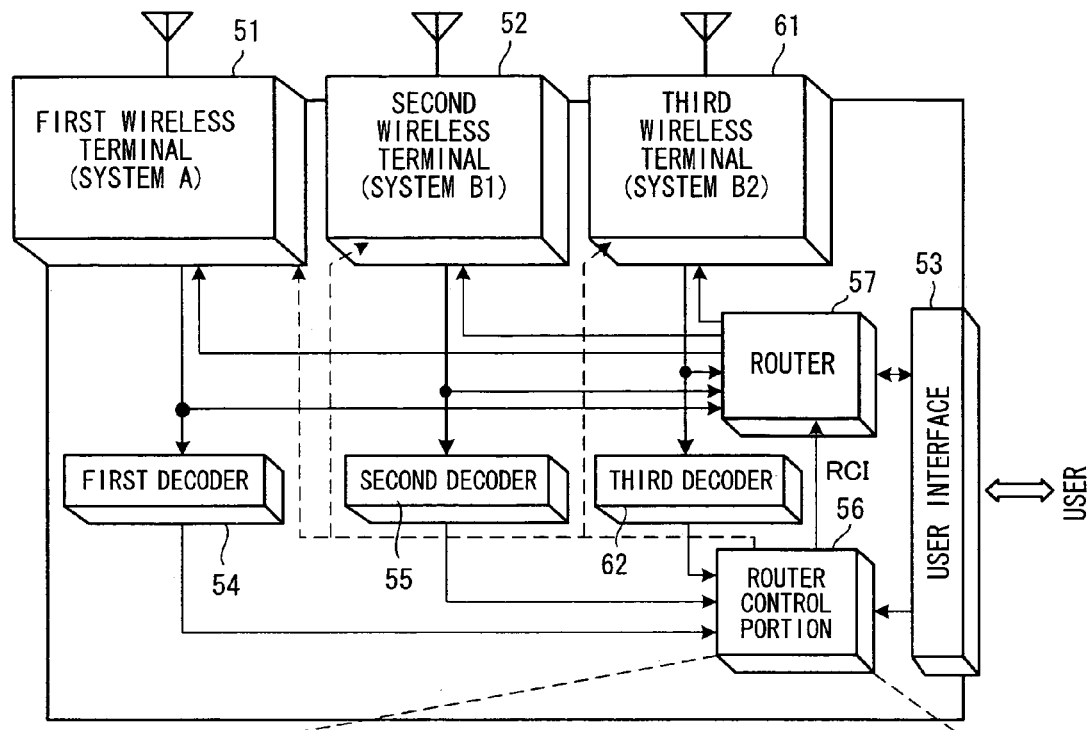
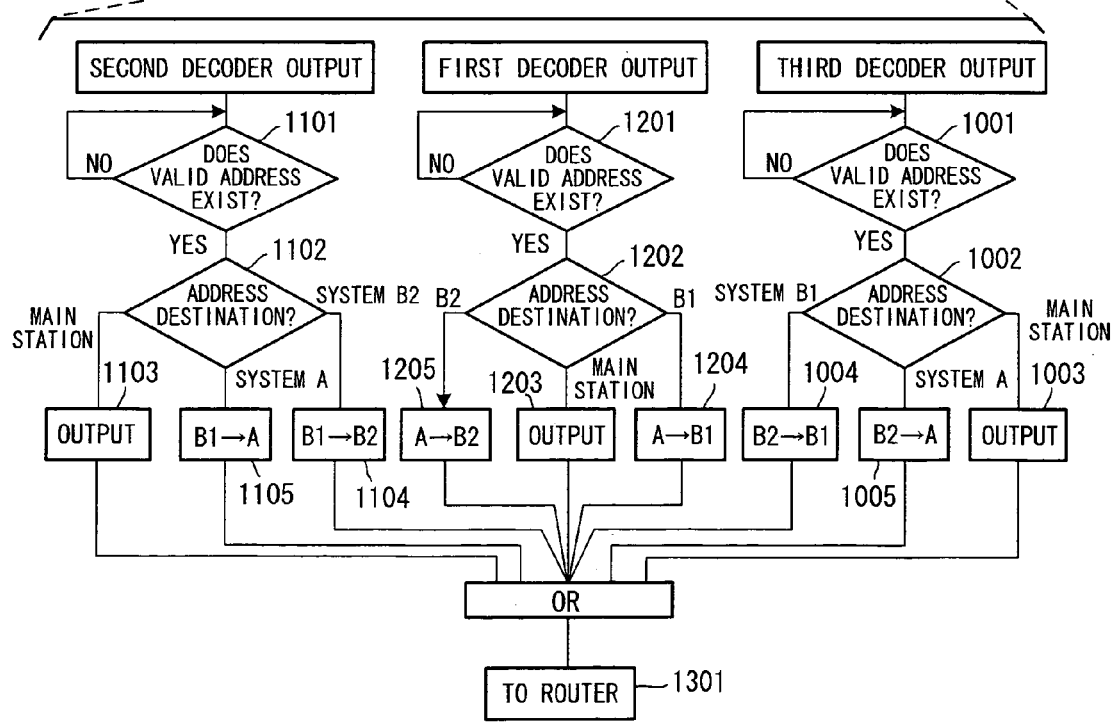

MOBILE WIRELESS TERMINAL DEVICE

CROSS-REFERENCE TO RELATED APPLICATION

This application is a continuation of International Application PCT/JP03/00951 which was filed on Jan. 31, 2003, the contents of which are herein wholly incorporated by reference.

BACKGROUND OF THE INVENTION

The present invention relates to a mobile wireless terminal device as a mobile wireless station and, more particularly, to a mobile wireless terminal device in the mobile wireless field represented by cellular phones and wireless LAN and in the ITS (Intelligent Transport System) field such as autonomous distributed-type network, in-vehicle wireless LAN, and intervehicular wireless communications and DSRC (Digicated Short Range Communications).

In the case of conventional cellular phones and wireless LAN, the cellular system or hot spot system is adopted. Autonomous distributed-type network, in-vehicle wireless LAN, and intervehicular communications are at the research and development stage and have not been put to practical use. Although DSRC technology, for which research and development is relatively advanced, has been put to practical use in the Electronic Toll Collection System, and so forth, this technology belongs to the hot spot system.

Although current mobile wireless terminal applications include mobile wireless terminals of a multiplicity of types, because there is no compatibility between each of the wireless systems, the following problems exist. That is, there are problems such as the following:

(1) a plurality of terminals must be carried around when various kinds of services are to be received;
(2) the sharing merging of information between a plurality of systems is impossible; and
(3) although there is a demand for a serviceable adhoc network for an ITS, at present, technology established for in-vehicle LAN and intervehicular communications to allow the construction of such a network does not exist.

Japanese Patent Application Laid Open Nos. H2000-31895 and H8-84373 disclose a communication system that uses a mobile device as a relay device in order to broaden the area permitting communications. However, the mobile device does not constitute an adhoc network and the communication area is not extended by organically combining a plurality of different wireless systems.

SUMMARY OF THE INVENTION

An object of the present invention is to solve the problems (1) to (3) above by organically combining a plurality of wireless systems that are currently used or wireless systems that are expected to be used in the future.

The mobile wireless terminal device as a main mobile wireless station of the present invention comprises:

(1) first wireless communication portion that is capable of communicating mutually with a wireless base station in accordance with a first wireless system; (2) second wireless communication portion that is capable of communicating mutually with other mobile wireless station in accordance with a second wireless system; (3) user interface portion that permits two-way information transmission with a user; (4) first extraction portion for extracting control information from information that is received via the first wireless communication portion; (5) second extraction portion for extracting control information from information that is received via the second wireless communication portion; (6) control portion for determining an operational policy on the basis of control information that is extracted by the first and second extraction portion and user information and for emitting routing control information on the basis of the operational policy; and (7) router for controlling the route of information received via the first and second wireless communication portion and user information on the basis of the routing control information.

The control portion (1) detects, when the main mobile wireless station is in the communication area of a wireless base station of the first wireless communication system other mobile wireless station comprising the second wireless communication portion has appeared in a place where is within the communication area of the second wireless communication system of the main mobile wireless station and outside the communication area of the first wireless communication system;

(2) starts communications with the other mobile wireless station by the second wireless communication portion in accordance with a request from the other mobile wireless station; (3) communicates with the wireless base station of the first wireless communication system and with the other mobile wireless station of the second wireless communication system simultaneously and (4) controls the router to relay the communication content from the wireless base station of the first wireless communication system and transmit the communication content to the other mobile wireless station and to relay the communication content from the other mobile wireless station of the second wireless communication system and transmit the communication content to the wireless base station; and (5) terminates relay control when the other mobile wireless station moves outside the communication area of the second wireless communication system of the main mobile wireless station or when there is a communication termination request from the other mobile wireless station.

Furthermore, the control portion (1) searches for another mobile wireless station comprising the first and second wireless communication portions in the communication area of the second wireless communication system when the main mobile wireless station moves outside the communication area of the wireless base station of the first wireless communication system; and, (2) upon detecting the other mobile wireless station, issues a relay request to the other mobile wireless station and communicate with the wireless base station of the first wireless communication system via the other mobile wireless station.

The mobile wireless terminal device of the present invention permits communications by organically combining a plurality of currently used wireless systems or wireless systems that are expected to be used in the future.

BRIEF DESCRIPTION OF THE DRAWINGS

FIG. 16 is a block diagram of the constitution of the mobile wireless terminal device of the second embodiment and the process flow of the main station in FIG. 2;

FIG. 17 is a block diagram of the constitution of the mobile wireless terminal device of the third embodiment and the process flow of the main station in FIG. 3;

FIG. 18 is a block diagram of the constitution of the mobile wireless terminal device of the fourth embodiment and the process flow of the main station in FIG. 4;

FIG. 19 is a block diagram of the constitution of the mobile wireless terminal device of the fifth embodiment and the process flow of the main station in FIG. 5;

FIG. 20 is a block diagram of the constitution of the mobile wireless terminal device of the sixth embodiment and the process flow of the main station in FIG. 6;

FIG. 21 is a block diagram of the constitution of the mobile wireless terminal device of the seventh embodiment and the process flow of the main station in FIG. 7;

FIG. 23 is a block diagram of the constitution of the mobile wireless terminal device of the ninth embodiment and the process flow of the main station in FIG. 9; and FIG. 24 is a block diagram of the constitution of the mobile wireless terminal device of the tenth embodiment and the process flow of the main station in FIG. 10.

DESCRIPTION OF THE PREFERRED EMBODIMENTS (A) Overview of the Present Invention (a) Overview of First Embodiment FIG. 1 is an explanatory view of the overall operation of the first embodiment of the present invention. An area 10 shown by a hexagon is a communication area of a wireless base station 1 based on a first wireless communication system such as a Third Generation mobile phone system. An area 20 shown by a circle, is a communication area in a second wireless communication system such as a mobile wireless LAN system. Mobile stations 2 and 3 are able to communicate by a first mobile wireless system (system A) and a second mobile wireless system (system B).

Figure 1:
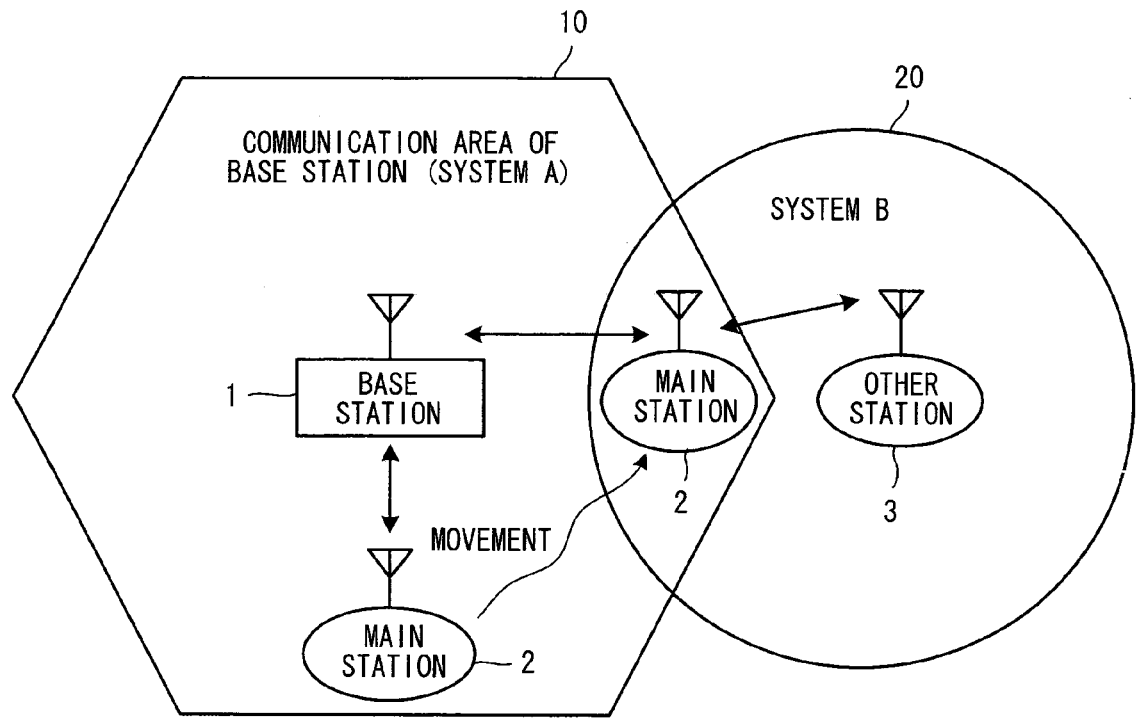
FIG. 1 is an explanatory view of the overall operation of a first embodiment of the present invention.

When an interested mobile wireless station 2 referred to as a main station hereinafter is in a communication area 10 of the wireless base station 1 of the first wireless communication system A. There, it detects another mobile station 3 appears in a place which is in a communication area 20 of the second wireless communication system B of the main station 2 and is outside the communication area 10 of the first wireless communication system A.

The main station 2 starts to communicate with the other mobile wireless station 3 by the second wireless communication system B based upon a relay request from the other station 3. Thereby, it simultaneously communicates with wireless base station 1 by the first wireless communication system A and with the other station 3 by the second wireless communication system B.

The main station 2 then controls the router to relay the communication content from wireless base station 1 of the first wireless communication system A and transmit the communication content to the other station 3 and to relay the communication content from the other station 3 of the second wireless communication system B and transmit the communication content to wireless base station 1. Further, the main station 2 terminates relay control when the other station 3 moves outside communication area 20 of the second wireless communication system B of the main station 2 or there is a request to terminate communications from the other station 3.

Figures 11, 12:
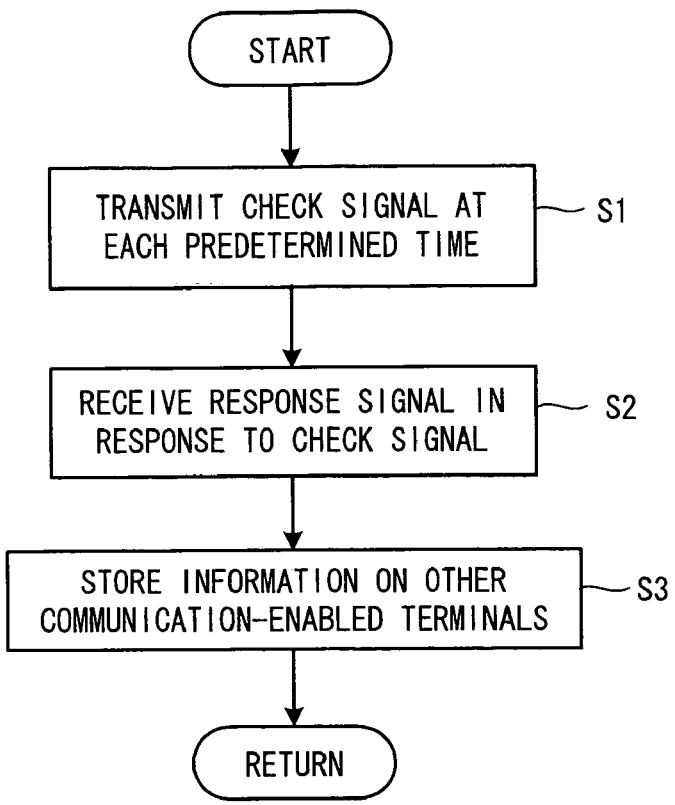
FIG. 11 shows the process flow that identifies other stations that exist in the periphery of the main mobile wireless station.
FIG. 12 is an example of storage of information on other stations that are able to communicate directly by wireless systems A and B.

The main station is able to identify another station that exists in the periphery of the main station in accordance with the flow shown in FIG. 11. However, each station has a unique address (an IPV6 address, for example). The main station transmits a check signal radio wave, which has its own address appended thereto, at regular intervals (step S1). The other station, which receives the check signal radio wave, then transmits a response signal with its own address appended thereto by setting the emission source address of the check signal radio wave as the destination (step S2). The main station receives the response signal radio wave and identifies, collects, and stores peripheral stations that are able to communicate (step S3). The response signal can include information on communication-enabled stations that is similarly acquired by the other stations. FIG. 12 is an example of storage of information on other stations that are able to communicate directly by wireless systems A and B, wherein the addresses of terminals that are able to communicate by wireless system A are A1, A2 . . . and the addresses of terminals that are able to communicate by wireless system B are B1, B2, . . . . The above system of collecting peripheral terminals is a system that is implemented by an adhoc network.

According to the first embodiment, when the main station 2 exists in a cell 10 of a relatively large-scale cellular-type communication system and other station 3 that is outside the cell 10 desires to communicate with a wireless base station 1, main station 2 relays information between the other station and the wireless base station as far as the main station 2 exists in a position that allows such communication to be performed. The fact that the other station 3 desires to communicate with wireless base station 1 is detected by monitoring signals from other stations constantly.

(b) Overview of Second Embodiment

Figure 2:
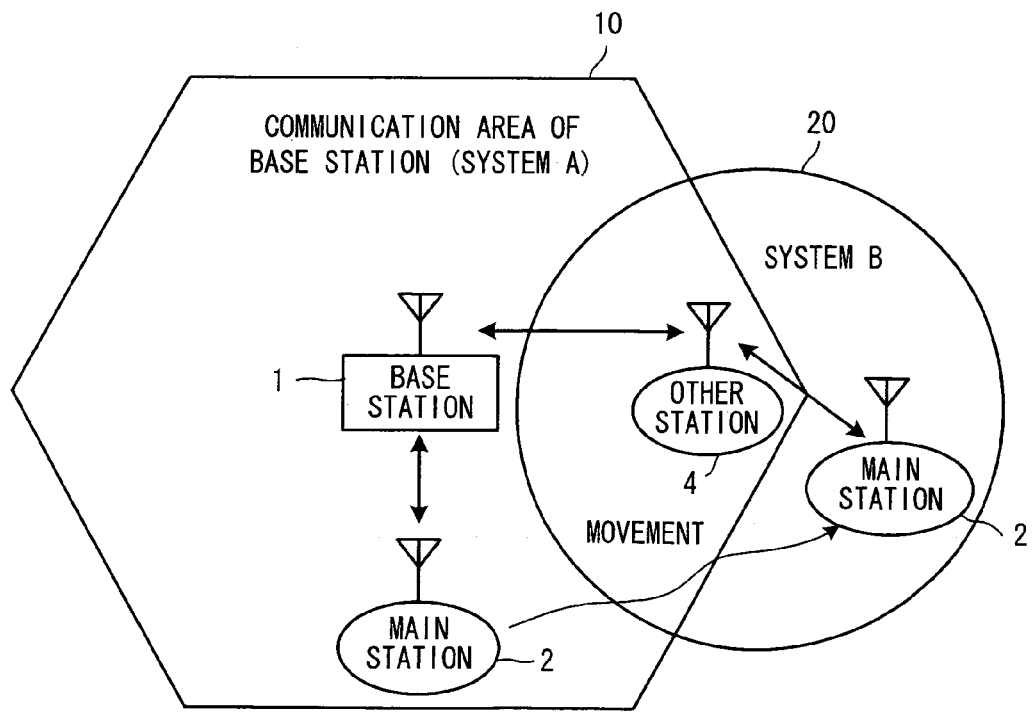
FIG. 2 is an explanatory view of the overall operation of a second embodiment of the present invention.

FIG. 2 is an explanatory view of the overall operation of the second embodiment of the present invention.

The main station 2 moves outside the communication area 10 of a wireless base station 1 which communicates by the first wireless communication system (system A). Then, it searches for another station 4 which is capable of communicating by the wireless communication systems (systems A and B), and which exists in communication area 20 of the second wireless communication system (system B) of the main station and exists in the communication area 10. Upon detecting the other station 4, the main station 2 issues a relay request to the other station and communicates with the wireless base station 1 of the first wireless communication system A via the other station 4.

The second embodiment grants the desire of the main station 2 to communicate by the relaying by the other station 4 when the positions of the other station and main station are the reverse of those in the first embodiment.

(c) Overview of Third Embodiment

Figure 3:
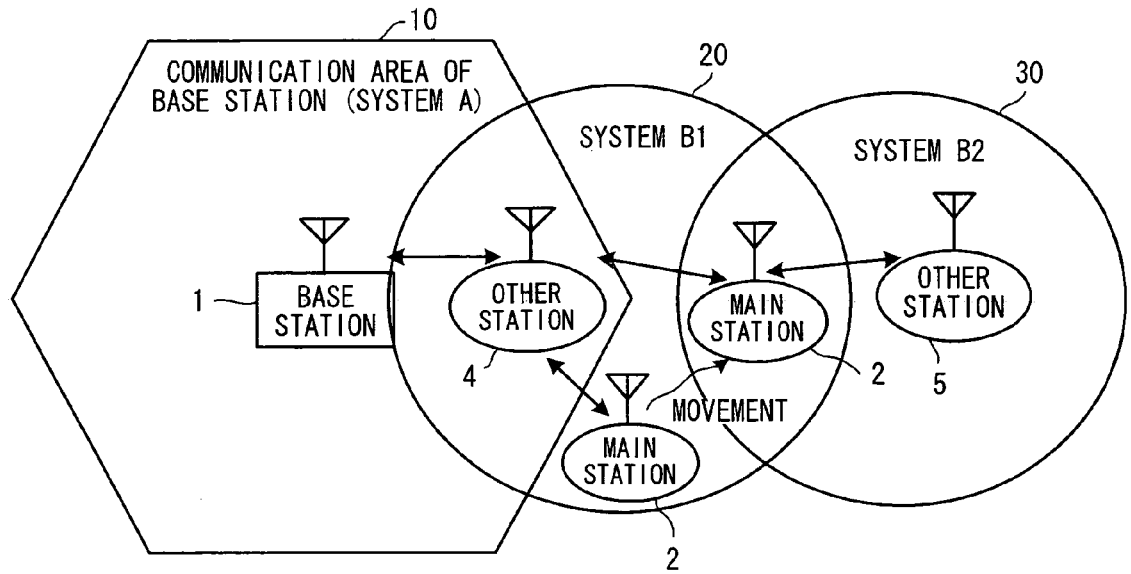
FIG. 3 is an explanatory view of the overall operation of a third embodiment of the present invention.

FIG. 3 is an explanatory view of the overall operation of the third embodiment of the present invention.

Area 10, which is shown by a hexagon, is the communication area of the wireless base station 1 of a first wireless communication system (Third Generation mobile phone system, for example). Area 20, which is shown by a first circle, is the communication area of a second wireless communication system. Area 30, which is shown by a second circle, is the communication area of a third wireless communication system.

The main station 2 is able to communicate by the first mobile wireless system (system A) and the second and third mobile wireless systems (systems B1 and B2). The main station 2 detects the fact that another mobile station 5 appears in the communication area 30 of the third wireless communication system B2 of the main station and outside the communication area 20 of the second wireless communication system B1. The main station 2 starts to communicate with the other station by the third wireless communication system (system B2) in accordance with a relay request from the other station 5. And it simultaneously communicates with the other station 4 of the second wireless communication system (system B1) and communicates with the other station 5 of the third wireless communication system B2. The main station 2 then controls router to relay and transfer the communication content from the other station 4 of the second wireless communication system B1 to the other station 5. In addition, the main station 2 controls router to relay and transmit the communication content from the other station 5 of the third wireless communication system B2 to the other station 4.

The third embodiment implements a broader service area because the other station 4 that is already relaying the communication signal from the wireless base station 1 is also relayed as a result of the main station 2 relaying the other stations 4 and 5.

(d) Overview of Fourth Embodiment

Figure 4:
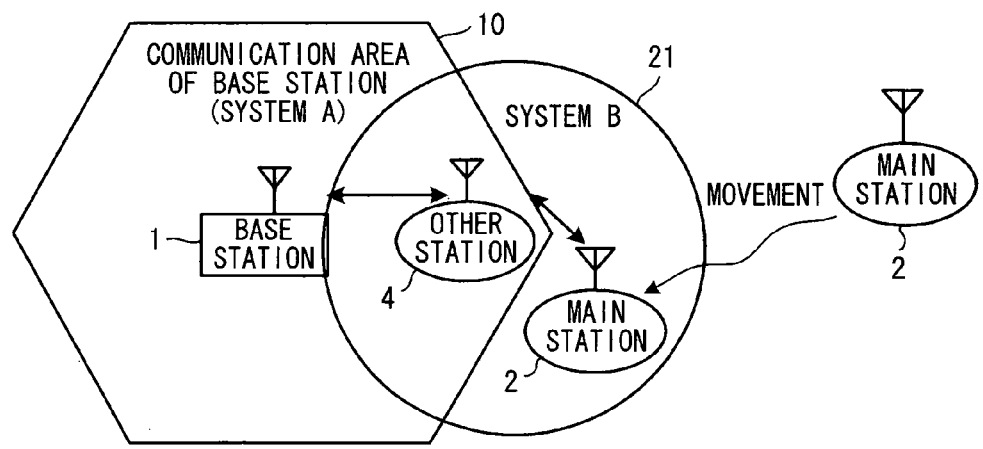
FIG. 4 is an explanatory view of the overall operation of a fourth embodiment of the present invention.

FIG. 4 is an explanatory view of the overall operation of the fourth embodiment of the present invention.

When the main station 2 exists outside the communication area 10 of wireless base station 1 and moves into a communication area 21 of the second wireless system (system B) of the other station 4 that exists in the communication area of the wireless base station 1, the main station 2 issues a relay request to the other station 4 and communicates with wireless base station 1 of the first wireless communication system A by relaying the other station 4. In this case, if the main station 2 moves into communication area 10 of the first wireless communication system A, the main station 2 communicates with wireless base station 1 directly by the first wireless system.

In the case of the fourth embodiment, upon approaching the periphery of cell 10, with which the main station 2 desires to communicate from completely outside the area, the main station 2 is able to communicate, in the same way as same would within the cell long before moving into the cell, as a result of the relaying by the other station 4 within the cell.

(e) Overview of Fifth Embodiment

Figure 5:
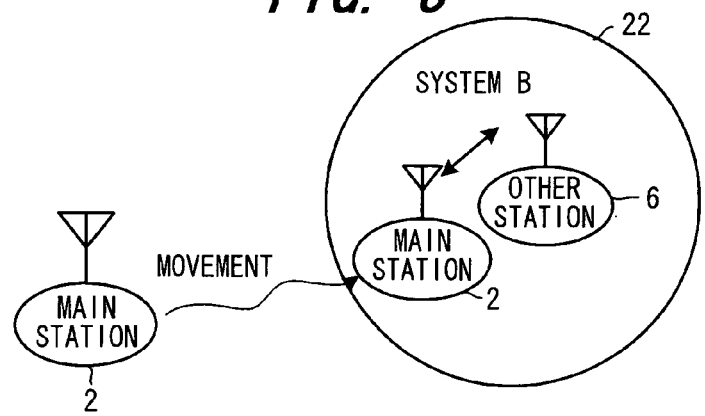
FIG. 5 is an explanatory view of the overall operation of a fifth embodiment of the present invention.

FIG. 5 is an explanatory view of the overall operation of the fifth embodiment of the present invention.

When the main station 2 exists outside the communication area of the wireless base station and moves into communication area 22 of the second wireless system B of another station 6, the main station 2 starts communicating autonomously with the other station 6. When the main station moves into the area 22 that permits communications with a certain other station 6 from completely outside the area, the main station 2 performs peer-to-peer random access and enters a state of being able to communicate with the other station 6 autonomously. By retaining this state, the main station 2 desires to encounter wireless base station 1, which desires communications that are expected in the future. A peer-to-peer network is a 'wireless network consisting of nodes that make it possible to establish a communication procedure autonomously without receiving the help of other stations on a one to one basis'.

(f) Overview of Sixth Embodiment

Figure 6:
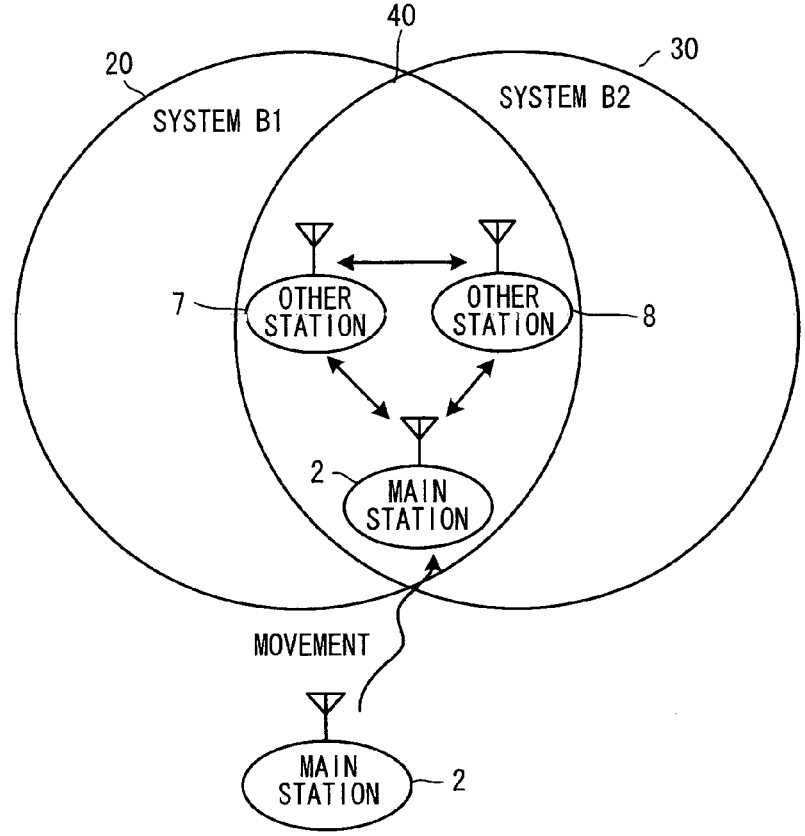
FIG. 6 is an explanatory view of the overall operation of a sixth embodiment of the present invention.

FIG. 6 is an explanatory view of the overall operation of the sixth embodiment of the present invention.

When the main station 2 exists outside the communication area of wireless base station 1, upon moving into a communication area 40 in which a plurality of other stations 7 and 8 are autonomously communicating with each other by the second wireless system, the main station 2 communicates autonomously with the other stations 7 and 8. That is, in the sixth embodiment, when the plurality of other stations 7, 8 are in a peer-to-peer communication state, when the peer-to-peer network of the fifth embodiment is formed and the appearance of the third station is expected, an adhoc network is established through the addition of the main station 2. An adhoc network is 'a wireless network consisting of nodes that allow a wireless network to be autonomously constructed in which nodes do not possess stations corresponding to wireless base stations or dedicated terminal functions for executing the control functions of the wireless resources, or the like'.

(g) Overview of Seventh Embodiment

Figure 7:
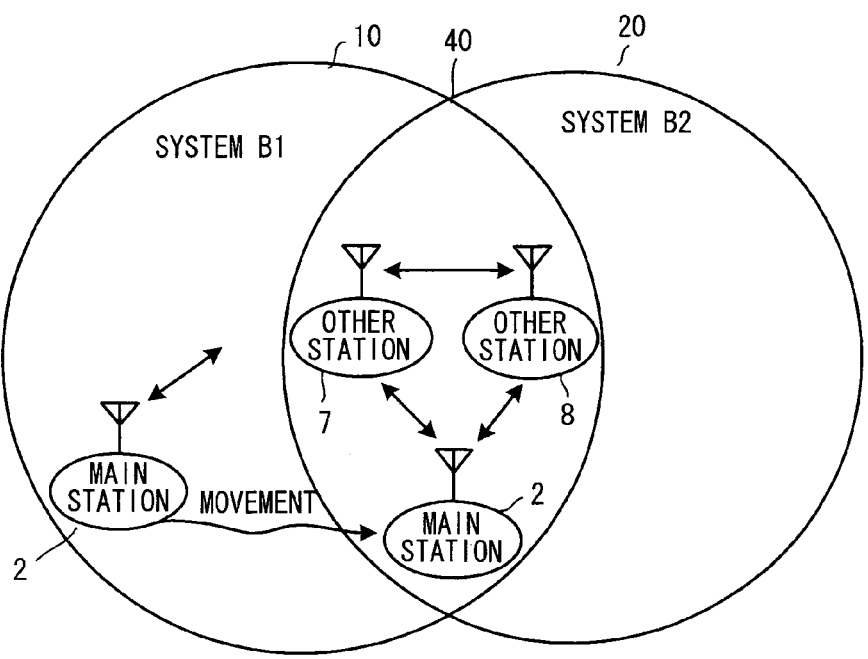
FIG. 7 is an explanatory view of the overall operation of a seventh embodiment of the present invention.

FIG. 7 is an explanatory view of the overall operation of the seventh embodiment of the present invention.

When the main station 2 exists in an area outside the communication area of wireless base station 1 and moves into a communication area 40 in which a plurality of other stations 7, 8, which includes station 7 that is communicating, are autonomously communicating with each other by the second wireless system, the main station 2 communicates simultaneously with the station 7 that is communicating and with the other station 8.

The seventh embodiment is an example in which, when the plurality of other stations 7, 8, which includes the main station 2, is operating according to a relay mode, an evolution into an adhoc network is implemented by changing the position of the main station 2.

(h) Overview of Eighth Embodiment

Figure 8:
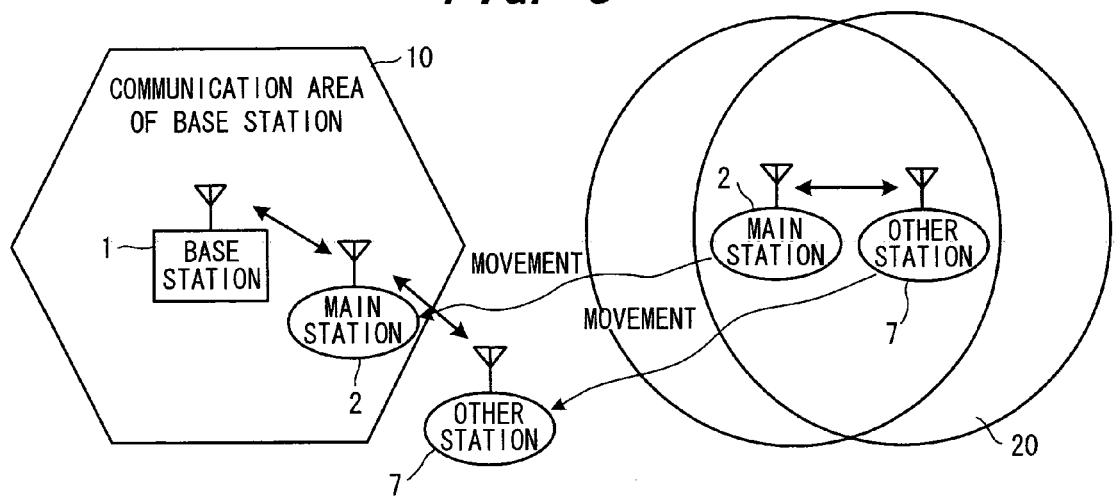
FIG. 8 is an explanatory view of the overall operation of an eighth embodiment of the present invention.

FIG. 8 is an explanatory view of the overall operation of the eighth embodiment of the present invention.

When the main station 2 is outside the communication area 10 of the wireless base station 1 and moves into the communication area 20 of the second wireless system B of the other station 7, the main station 2 communicates autonomously with the other station 7 by a peer-to-peer connection and, upon moving into the communication area 10 of the wireless base station while performing this communication, the main station 2 relays communications between the other station 7 and the wireless base station 1 in accordance with a request from the communicating other station 7. That is, in the case of the eighth embodiment, when the main station 2 and other station 7, which are in a peer-to-peer relationship, approach the communication area 10 of wireless base station 1 with which communication is desired, communications between the other station 7 and the wireless base station 1 are relayed by establishing station 2 as a relay station.

(i) Overview of Ninth Embodiment

Figure 9:
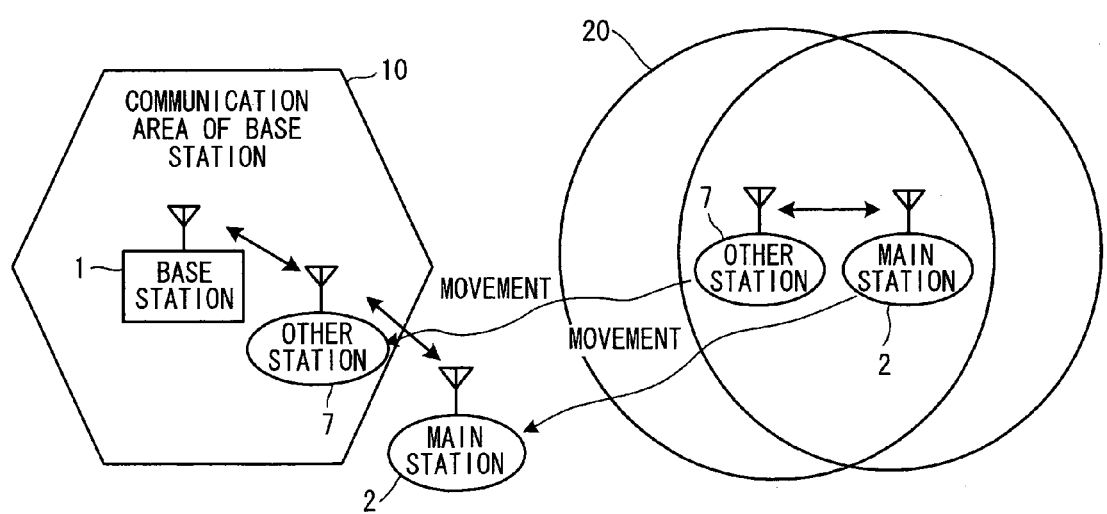
FIG. 9 is an explanatory view of the overall operation of a ninth embodiment of the present invention.

FIG. 9 is an explanatory view of the overall operation of the ninth embodiment of the present invention.

When the main station 2 is outside the communication area 10 of wireless base station 1 and moves into the communication area 20 of the second wireless system of the other station 7, the main station 2 communicates autonomously with the other station 7 by a peer-to-peer connection and, when the other station 7 moves into the communication area 10 of the wireless base station while performing this communication, the main station 2 issues a request to the other station 7 to relay communications to the wireless base station 1. In the case of the ninth embodiment, even when the relationship between the main station and other station is the reverse of that of the eighth embodiment, communications can be relayed by issuing a relay request to the other station 7.

(j) Overview of Tenth Embodiment

Figure 10:
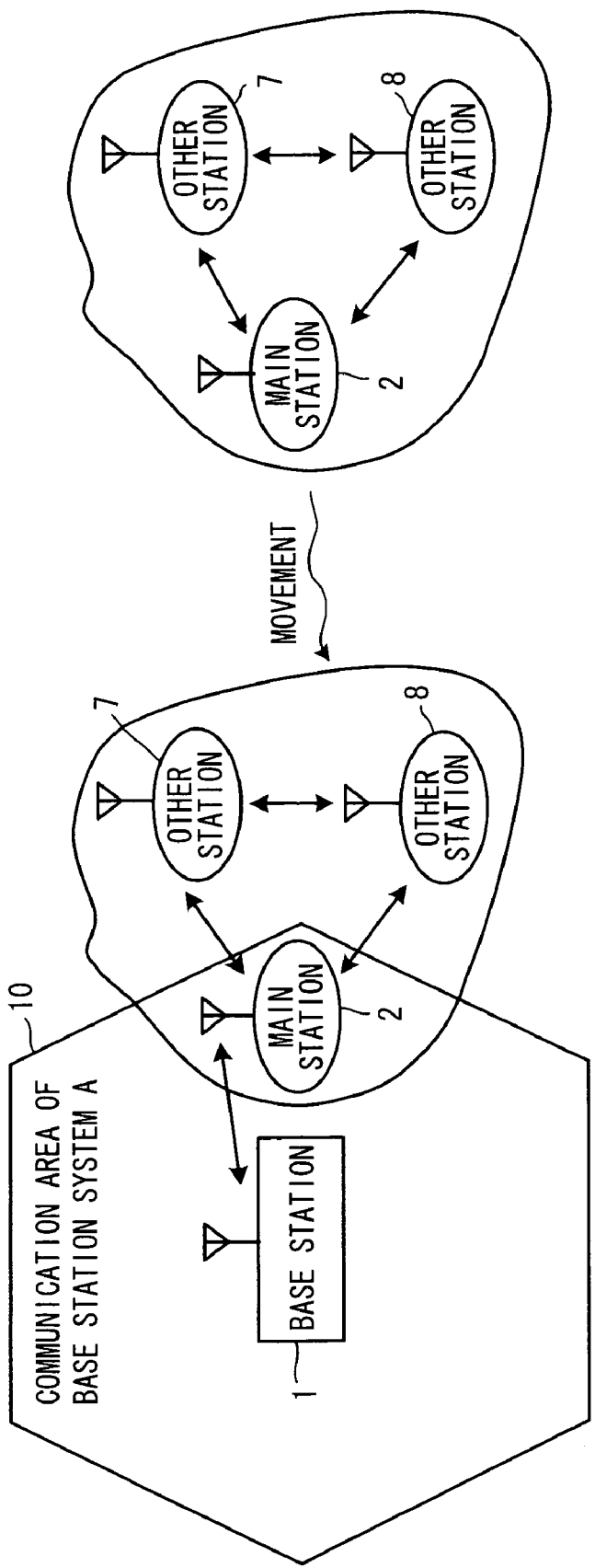
FIG. 10 is an explanatory view of the overall operation of a tenth embodiment of the present invention.

FIG. 10 is in explanatory view of the overall operation of the tenth embodiment of the present invention.

When the main station 2 exists outside the communication area 10 of wireless base station 1 and moves into the communication area 10 of the wireless base station while communicating autonomously with the plurality of other stations 7, 8 by constituting an adhoc network by the second wireless system, the main station 2 relays communications between the other stations 7, 8 and the wireless base station 1 in accordance with requests from the communicating other stations 7 and 8.

In the case of the tenth embodiment, after the main station 2 in a group of stations in an autonomous distributed state from the main station 2 and the plurality of other stations 7 and 8 has moved into cell 10 with which communication is desired, the main station serves as a relay station while retaining the autonomous distributed state.

(B) First Embodiment

Figure 13:
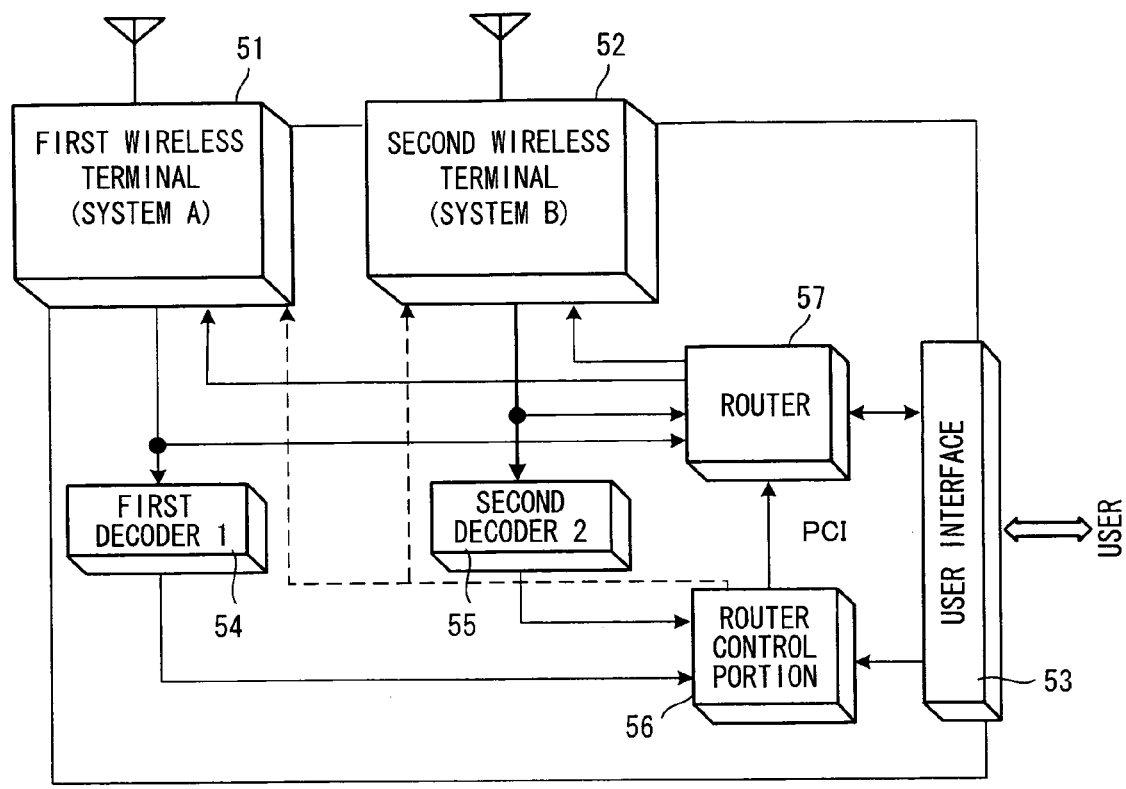
FIG. 13 is a block diagram of the constitution of a mobile wireless terminal device that can be used as the mobile station of the first embodiment.

FIG. 13 is a block diagram of the constitution of a mobile wireless terminal device that can be used as the mobile stations 2, 3 of the first embodiment. The mobile wireless terminal device comprises a first wireless terminal portion 51 that is able to communicate by a mutual wireless connection with a wireless base station device 1 (see FIG. 1) in accordance with a first wireless system A (Third Generation cell phone system, for example); a second wireless communication terminal portion 52 that is able to communicate by a mutual wireless connection with a wireless station in accordance with a second wireless system B (mobile wireless LAN system, for example); a user interface portion 53 that performs two-way information transmission with a user (a key operation display portion and so forth); a first decoder 54 that extracts control information from information that is received via the first wireless communication terminal portion 51; a second decoder 55 that extracts control information from information that is received via the second wireless terminal 52; router control portion control portion 56 for determining the operational policy of the main station on the basis of the control information extracted by the first and second decoders and user information and for issuing routing control information RCI on the basis of the operational policy; and a router 57 that controls the route of information received via the first and second wireless terminals 51, 52 and user information on the basis of the routing control information RCI.

The first embodiment is an embodiment in which, when main station 2 exists in the cell 10 in a relatively large-scale cellular-type communication system as shown in FIG. 1 and another station 3 outside the cell desires to communicate with wireless base station 1, the main station 2 relays the other station 3 and wireless base station 1 only when main station 2 exists in a position that allows such communications to be performed.

Figure 14:
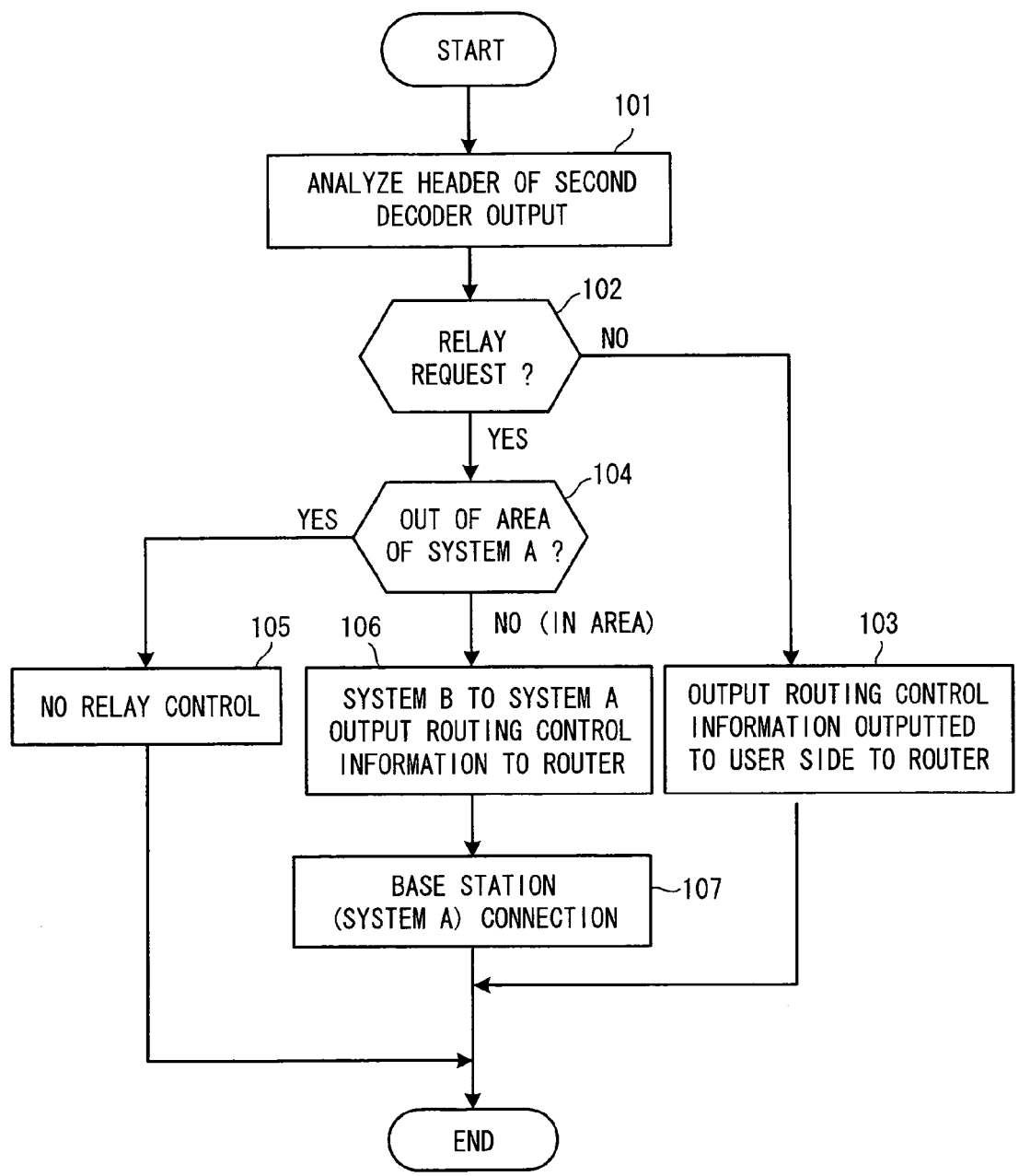
FIG. 14 shows the process flow of the relaying by the main station of the first embodiment.

In the state of FIG. 1, the main station 2 performs relay control in accordance with the flow in FIG. 14. The second wireless terminal 52 of the main station outputs a signal that is received from the other station 3 by the second wireless system B and the second decoder 55 decodes the header of the received information and inputs the decoded header to router control portion 56. The router control portion 56 then analyzes the header information (step 101) and checks whether the header information is a relay request (step 102). The decision regarding whether the header information is a relay request is implemented by detecting whether the destination address is an address other than an address of the second wireless system B, for example.

If the header information is not a relay request, the router control portion 56 inputs routing control information RCI for an output to the user side to the router 57 and the router 57 outputs information that is outputted by the second wireless terminal portion 52 to the user side via the user interface 53 (step 103).

In step 102, if the header information is a request to relay information to wireless base station 1, it is judged whether the main station is outside the communication area of the first wireless system A (step 104). And, if the main station is outside the area, relay control is not performed and is disregarded (step 105). On the other hand, if the main station is within the area, routing control information RCI for relaying information from the second wireless system B to the first wireless system A is inputted to the router 57 (step 106). And an instruction to connect to the wireless base station 1 is issued to the first wireless terminal portion 51 (107). Hereinabove, the router 57 routes information that is outputted by the second wireless terminal portion 52 to the first wireless terminal portion 51 and the first wireless terminal portion 51 calls and connects the wireless base station to relay the information to the wireless base station 1 (step 103). Further, when another station moves outside the communication area of the second wireless communication system B of the main station or there is a communication termination request from another station, relay control is terminated.

Figure 15:
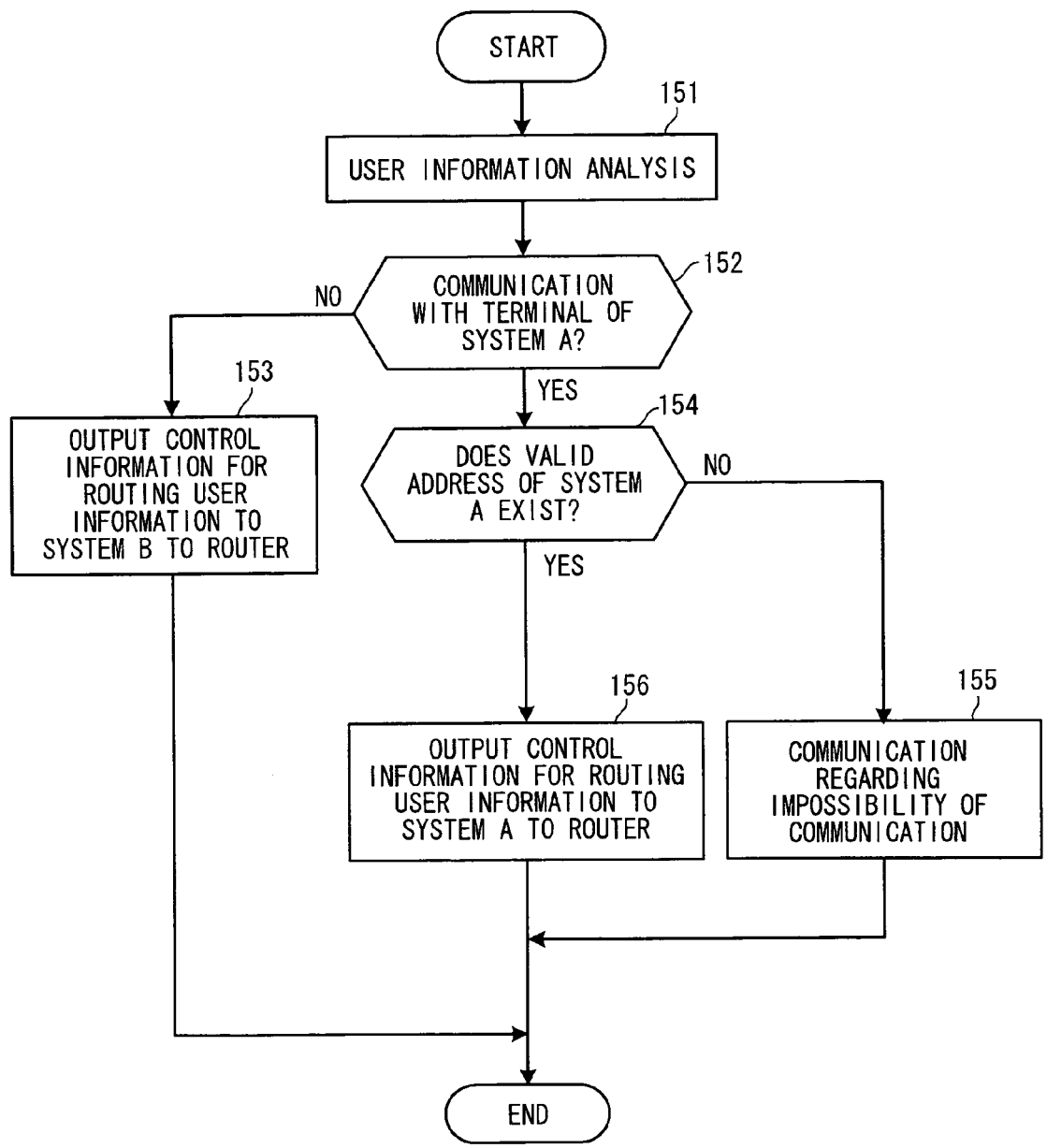
FIG. 15 shows the process flow of another station of the first embodiment.

FIG. 15 shows the flow of control of the other station 3 in FIG. 1.

When user information is inputted via the user interface, the router control portion 56 analyzes the user information (step 151) and judges whether there is a desire to communicate with the mobile station of the first wireless system A (step 152). When there is a desire to communicate with the mobile station of the second wireless system B, the router control portion 56 inputs routing control information RCI for an input to the second wireless terminal portion 52 to the router 57, whereupon the router 57 inputs the user information to the second wireless terminal portion 52 and the second wireless terminal portion 52 transmits the user information by the second wireless system B (step 153).

In step 152, if there is a desire to communicate with a mobile station of the first wireless system A, the router control portion 56 references information on peripheral communication-enabled terminals that has been collected at regular intervals (see FIGS. 11 and 12) and checks whether a mobile station that is capable of communicating by the first wireless system A exists in the periphery (step 154). If no such mobile station exists, the router control portion 56 terminates control by communicating the fact that communication is impossible to the user (step 155) and, if a mobile station 2 (FIG. 1), which is capable of communicating by the first wireless system A, exists in the periphery, the router control portion 56 inputs routing control information RCI for inputting user information to the second wireless terminal portion 52 to the router 57 and issues an instruction to the second wireless terminal portion 52 to render the mobile station 2 a relay station (step 156). The router 57 inputs user information to the second wireless terminal portion 52 and the second wireless terminal portion 52 transmits user information to the relay station A by the second wireless system B.

(C) Second Embodiment

FIG. 16 is a block diagram of the constitution of the mobile wireless terminal device of the second embodiment and the process flow of the main station 2 in FIG. 2. The same reference numerals have been assigned to the same parts as those of the first embodiment in FIG. 13. As shown in FIG. 2, the second embodiment grants the desire of the main station 2 to communicate by the relaying by the other station 4 when the positions of the other station and main station are the reverse of those in the first embodiment.

The main station (mobile wireless terminal device) 2 transmits a check signal radio wave in order to identify other stations that exist in the periphery of the main station in accordance with the process flow of FIG. 11 at regular intervals for each of the first wireless system A and the second wireless system B, decodes a signal that is received from a peripheral mobile station by the first and second decoders 54 and 55 respectively and inputs the decoded signal to the router control portion 56, whereby the router control portion 56 is made aware of the peripheral terminals that are able to communicate in accordance with the wireless systems A, B respectively.

When user information is inputted from the user interface 53, the router control portion 56 analyzes the user information and, if there is a desire to communicate with a mobile station of the first wireless system A, the router control portion 56 references information on communication-enabled terminals that has been collected at regular intervals by the first decoder 54 and checks whether such terminals are outside the communication area of the first wireless system A (step 201). If the terminals are within the communication area, the router control portion 56 creates routing control information RCI for inputting the user information to the first wireless terminal portion 51 and inputs the routing control information RCI to the router 57. As a result, the router 57 inputs the user information to the first wireless terminal portion 51 and the first wireless terminal portion 51 calls the wireless base station 1 (system A call, step 202) and transmits the user information directly to the wireless base station 1 (step 203).

On the other hand, if a terminal is outside the area in step 201, the router control portion 56 references information on peripheral communication-enabled terminals and checks whether another station that is capable of communicating by the first wireless system A exists in the periphery (step 204). If no such station exists, the router control portion 56 communicates the fact that communication is impossible to the user and terminates the control (step 205). On the other hand, if mobile station 4 (FIG. 2), which is capable of communicating by the first wireless system A exists in the periphery, the router control portion 56 creates routing control information RCI for inputting user information to the second wireless terminal portion 52 and inputs the routing control information RCI to the router 57 before issuing an instruction to the second wireless terminal portion 52 to perform transmission by relaying the other station 4. As a result of the above process, the router 57 routes the user information to the second wireless terminal portion 52 and the second wireless terminal portion 52 calls the other station 4 (system B call, step 206) and issues a request to the other station to relay information to wireless base station 1 before transmitting the user information to the wireless base station via the other station 4 (step 207).

(D) Third Embodiment

FIG. 17 is a block diagram of the constitution of the mobile wireless terminal device of the third embodiment and the process flow of the main station 2 in FIG. 3. The same reference numerals have been assigned the same parts as those of the first embodiment in FIG. 13. The constitution differs from that of the first embodiment in that, in addition to being provided with the first wireless terminal portion 51, which is capable of communicating by a mutual wireless connection with a wireless base station in accordance with the first wireless system A and the second wireless communication terminal portion 52, which is capable of communicating by a mutual wireless connection with a wireless station in accordance with the second wireless system B1, the wireless mobile terminal device comprises a third wireless communication terminal portion 61, which is capable of communicating by a mutual wireless connection with a wireless station in accordance with a third wireless system B2 and a third decoder 62 that extracts control information from information that is received via the third wireless terminal portion 61.

The third embodiment is an embodiment in which, as shown in FIG. 3, a broader service area is implemented by also relaying the other station 4 that is already relaying a communication signal from the wireless base station 1 as a result of the main station 2 relaying the other stations 4, 5.

The mobile wireless terminal device transmits a check signal radio wave in order to identify other terminals that exist in the periphery of the main station in accordance with the process flow in FIG. 11 at regular intervals for each of the first wireless system A, second wireless system B1, and third wireless system B2 and decodes a signal that is received from a peripheral mobile station by the first to third second decoders 54, 55, and 62 respectively and inputs the decoded signal to the router control portion 56, whereby the router control portion 56 is made aware of the peripheral terminals that are able to communicate in accordance with the wireless systems A, B1 and B2 respectively.

The third wireless terminal portion 61 receives a signal by the third wireless system B2 and inputs received information to the router 57 and the third decoder 62. The router control portion 56 references the decoded destination address to check whether the received information is a relay request (step 301). If the received information is not a relay request, the router control portion 56 determines that the received information is to be outputted to the user side (step 302) and inputs routing control information RCI to the router 57 (step 303), whereupon the router 57 outputs information that is outputted by the third wireless terminal portion 61 to the user side via the user interface 53.

In step 301, if the received information is a request to relay information to a system A area or system B1 area, the router control portion 56 references information on communication-enabled peripheral terminals that the router control portion 56 is aware of and checks whether a mobile station that is capable of communicating by the second wireless system B1 exists in the periphery, that is, whether a valid address exists (step 304). If such a mobile station does not exist, communication is impossible and is disregarded.

If a mobile station 4 that is capable of communicating by the second wireless system B1 (see FIG. 3) exists, the router control portion 56 determines that information is to be relayed from the third wireless system B2 to the second wireless system B1 (step 305) and inputs routing control information RCI to the router 57 before issuing an instruction to the second wireless terminal portion 52 to connect to the mobile station 4 of the second wireless system B1 (303). As a result of the above process, the router 57 routes information that is outputted by the third wireless terminal portion 61 to the second wireless terminal portion 52 and the second wireless terminal portion 52 calls and connects the mobile station 4 before relaying the inputted information to the mobile station 4.

Furthermore, if the second wireless terminal portion 52 renders a signal by the second wireless system B1, the second wireless terminal portion 52 inputs the received information to the router 57 and the second decoder 55. The router control portion 56 references the decoded destination address and checks whether the received information is a relay request (step 311). If the received information is not a relay request, the router control portion 56 determines that the information is to be outputted to the user side (step 312) and inputs routing control information RCI to the router 57 (step 303), whereupon the router 57 outputs information that is outputted by the second wireless terminal portion 52 to the user side via the user interface 53.

In step 311, in the event of a request to relay information to an area of system B2, information on grasped communication-enabled peripheral terminals is referenced to check whether communication with the mobile station of the destination is possible (step 313). If communication is impossible, the router control portion 56 disregards the relay request and, if communication is possible, the router control portion 56 determines that information is to be relayed from the second wireless system B1 to the third wireless system B2 (step 314), inputs routing control information RCI to the router 57 and issues an instruction to the third wireless terminal portion 52 to connect to the destination mobile station 5 (see FIG. 3) of the third wireless system B2 (303). As a result of the above process, the router 57 routes information that is outputted by the second wireless terminal portion 52 to the third wireless terminal portion 61 and the third wireless terminal portion 61 calls and connects the mobile station 5 and relays the inputted information to the mobile station 5.

(E) Fourth Embodiment

FIG. 18 is a block diagram of the constitution of the mobile wireless terminal device of the fourth embodiment and the process flow of the main station 2 in FIG. 4. The same reference numerals have been assigned to the same parts as those of the first embodiment in FIG. 13. As shown in FIG. 4, the fourth embodiment is an embodiment in which, upon approaching the periphery of cell 10, with which the main station 2 desires to communicate from completely outside the area, the main station 2 communicates in the same way as same would within the cell long before moving into the cell as a result of the relaying by the other station 4 within the cell.

When user information is inputted via the user interface 53, the router control portion 56 analyzes the user information and, if there is a desire to communicate with the mobile station of the first wireless system A, the router control portion 56 references information on peripheral communication-enabled terminals that has been collected at regular intervals by the first decoder 54 and thus checks whether such a terminal is outside the communication area of the first wireless system A (step 401). If the terminal is outside the communication area, the router control portion 56 creates routing control information RCI for inputting user information to the first wireless terminal portion 51 and inputs the created routing control information RCI to the router 57. The router 57 then inputs the user information to the first wireless terminal portion 51 and the first wireless terminal portion 51 calls the wireless base station 1 and transmits the user information directly to the wireless base station 1 (step 402).

On the other hand, if such a terminal is outside the area in step 401, the router control portion 56 references information on peripheral communication-enabled terminals to check whether a mobile station that is capable of communicating by the first wireless system A exists in the periphery (step 403). If such a mobile station does not exist, the fact that communication is impossible is communicated to the user and control is terminated (step 404). On the other hand, if the mobile station 4 (FIG. 4), which is capable of communicating by the first wireless system A, exists in the periphery, the router controlled portion 56 creates routing control information RCI for inputting user information to the second wireless terminal portion 52 and then inputs the routing control information RCI to the router 57 and issues an instruction to the second wireless terminal portion 52 to perform transmission by relaying the other station 4. As a result of the above process, the router 57 routes user information to the second wireless terminal portion and the second wireless terminal portion 52 calls the other station 4 (system B call, step 405), issues a request to the other station 4 to relay information to the wireless base station 1 (step 406) and transmits user information to wireless base station 1 via the other station.

(F) Fifth Embodiment

FIG. 19 is a block diagram of the constitution of the mobile wireless terminal device of the fifth embodiment and the process flow of the main station 2 in FIG. 5. The same reference numerals have been assigned to the same parts as those of the first embodiment in FIG. 13. The fifth embodiment is an embodiment in which, as shown in FIG. 5, when the main station 2 moves to area 22, which allows communication with the other station 6 that is completely outside the area, the main station 2 performs peer-to-peer random access and enters a state of being able to communicate with the other station 6 autonomously. By retaining this state, the main station 2 desires to encounter wireless base station 1, which desires communications that are expected in the future.

The mobile wireless terminal device transmits a check signal radio wave in order to identify other stations that exist in the periphery of the main station in accordance with the process flow of FIG. 11 at regular intervals for each of the first wireless system A and the second wireless system B, decodes a signal that is received from a peripheral mobile station by the first and second decoders 54 and 55 and inputs the decoded signal to the router control portion 56, whereby the router control portion 56 is made aware of the peripheral terminals that are able to communicate in accordance with the wireless systems A, B respectively.

It is checked whether communication is possible by the second wireless system B, that is, whether a valid address of the wireless communication system B exists (step 501). If a valid address does not exist, the router control portion 56 continues the check, and, if a valid address exists, the router control portion 56 calls the other station 6, which is capable of communicating by the second wireless system B, whereby a peer-to-peer network is formed (step 502). Thereafter, the router control portion 56 issues a request to the other station 6 to relay information to the wireless base station 1 by the second wireless system B with the peer-to-peer network still formed (step 503). Although the other station 6 disregards the request to relay information if such relaying is impossible, relay processing is executed if such relaying is possible.

(G) Sixth Embodiment

FIG. 20 is a block diagram of the constitution of the mobile wireless terminal device of the sixth embodiment and the process flow of the main station 2 in FIG. 6. The same reference numerals have been assigned to the same parts as those of the third embodiment in FIG. 17. The sixth embodiment is an embodiment in which, as shown in FIG. 6, when a plurality of other stations 7, 8 form a peer-to-peer network and the appearance of the third station is expected, the addition of the main station 2 establishes an adhoc network.

The mobile wireless terminal device (main station 2) transmits a check signal radio wave in order to identify other terminals that exist in the periphery of the main station in accordance with the process flow in FIG. 11 at regular intervals for each of the first wireless system A, second wireless system B1, and third wireless system B2 and decodes a signal that is received from a peripheral mobile station by the first to third decoders 54, 55, and 62 respectively and inputs the decoded signal to the router control portion 56, whereby the router control portion 56 is made aware of the peripheral terminals that are able to communicate in accordance with the wireless systems A, B1 and B2 respectively.

It is checked whether communication is possible by the third wireless system B2, that is, whether a valid address of the wireless communication system B2 exists (step 601). If a valid address does not exist, the router control portion 56 continues the check, and, if a valid address exists, the router control portion 56 calls the other station 8, which is capable of communicating by the third wireless system B2, whereby a peer-to-peer network is formed. Similarly, it is checked whether it is possible to communicate by the second wireless system B1, that is, it is checked whether a valid address of the wireless communication system B1 exists (step 602). If a valid address does not exist, the router control portion 56 continues the check and, if the valid address exists, the router control portion 56 calls the other station 7, which is capable of communicating by the second wireless system B1, whereby a peer-to-peer network is formed. As a result of the above process, an adhoc network is formed by the terminals 2, 7, 8.

If the third wireless terminal portion 61 receives information from the other station 8 by the third wireless system B2 in this state, the third wireless terminal portion 61 inputs the received information to the router 57 and the third decoder 62. The router control portion 56 references the decoded destination address to check whether the information is a relay request (step 603). If the information is not a relay request, the router control portion 56 determines that the information is to be outputted to the user side (step 604) and inputs routing control information RCI to router 57 (step 605), whereupon the router 57 outputs information that is outputted by the third wireless terminal portion 61 to the user side via the user interface 53.

In step 603, if there is a request to relay information to terminal 7 in the area of system B1, the router control portion 56 determines that information is to be relayed from the third wireless system B2 to the second wireless system B1 (step 606), and then inputs routing control information RCI to the router 57 and issues an instruction to relay the information to the mobile station 7 of the second wireless system B1 to the second wireless terminal portion 52 (605). As a result of the above process, router 57 routes information that is outputted by the third wireless terminal portion 61 to the second wireless terminal portion 52 and the second wireless terminal portion 52 relays the information to the mobile station 7.

On the other hand, if the second wireless terminal portion 52 receives information from the other station 7 by the second wireless system B1, the second wireless terminal portion 52 inputs the received information to the router 57 and the second decoder 52. The router control portion 56 references the decoded destination address and checks whether the information is a relay request (step 607). If the information is not a relay request, the router control portion 56 determines that the information is to be outputted to the user side (step 608) and then inputs routing control information RCI to the router 57 (step 605), whereupon the router 57 outputs the information that is outputted by the third wireless terminal portion 61 to the user side via the user interface 53.

In step 607, if the information is a request to relay information to the other station 8 of the system B2, the router control portion 56 determines that information is to be relayed from the second wireless system B1 to the third wireless system B2 (step 609), and then inputs routing control information RCI to router 57 and issues an instruction to the third wireless terminal portion 61 to relay information to the mobile station 8 of the third wireless system B2 (605). As a result of the above process, the router 57 routes information that is outputted by the second wireless terminal portion 52 to the third wireless terminal portion 61 and the third wireless terminal 61 relays the information to the mobile station 8.

(H) Seventh Embodiment

FIG. 21 is a block diagram of the constitution of the mobile wireless terminal device of the seventh embodiment and the process flow of the main station 2 in FIG. 7. The same reference numerals have been assigned to the same parts as those of the third embodiment in FIG. 17. The seventh embodiment is an embodiment for a case where, as shown in FIG. 7, the main station 2 exists outside the communication area of wireless base station 1 and moves into a communication area 40, in which a plurality of other stations 7, 8 including station 7 that is communicating, communicate autonomously with each other by a predetermined wireless system, whereby an adhoc network is formed. The main station 2 has already formed a peer-to-peer network with the other station 7. As a result, with the exception of the fact that the processing in step 602 in FIG. 20 is unnecessary, the other processing is the same as that of the sixth embodiment in FIG. 20.

(I) Eighth Embodiment

Figure 22:
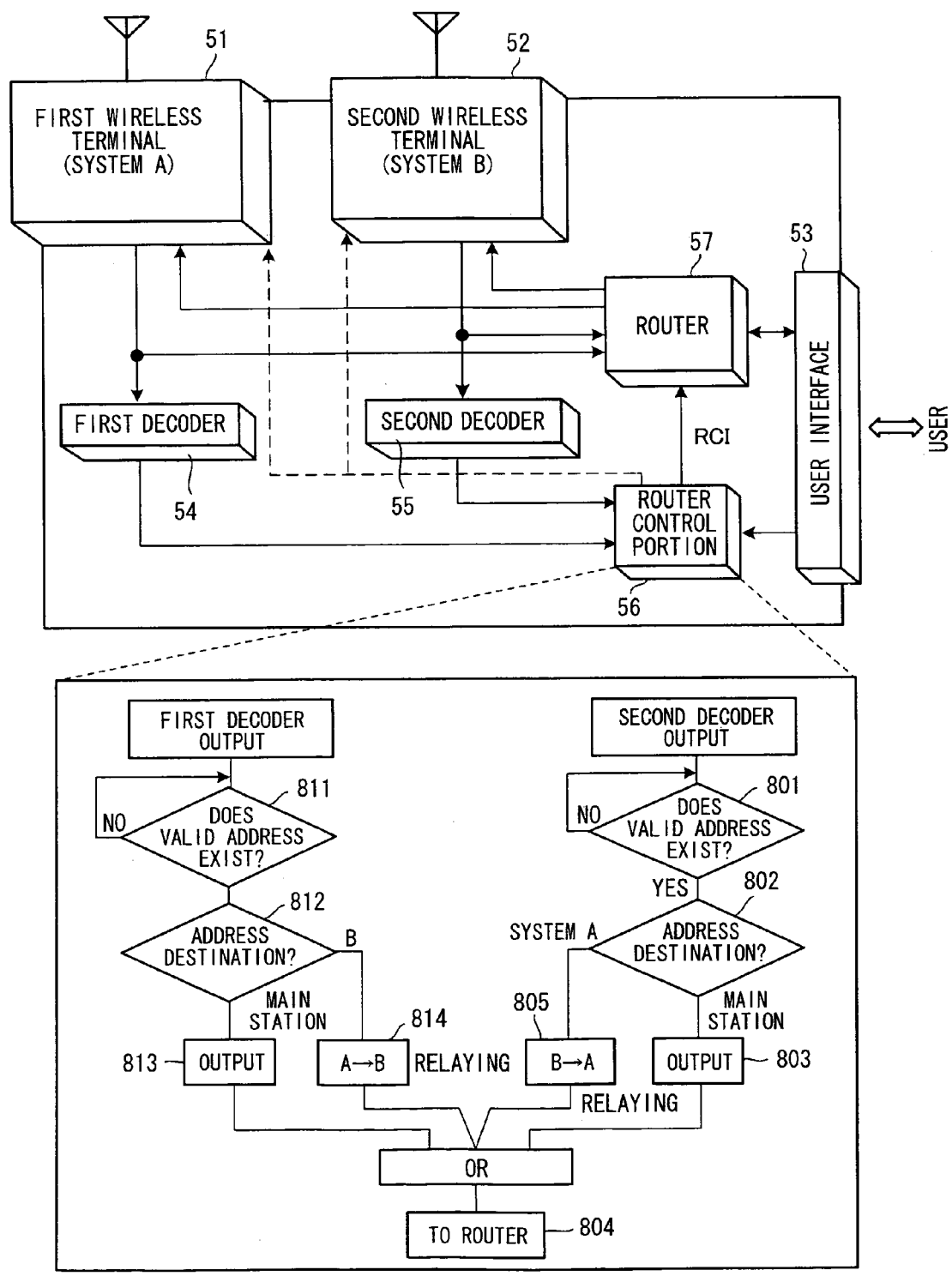
FIG. 22 is a block diagram of the constitution of the mobile wireless terminal device of the eighth embodiment and the process flow of the main station in FIG. 8.

FIG. 22 is a block diagram of the constitution of the mobile wireless terminal device of the eighth embodiment and the process flow of the main station 2 in FIG. 8. The same reference numerals have been assigned to the same parts as those of the first embodiment in FIG. 13. The eighth embodiment is an embodiment in which, as shown in FIG. 8, when the main station 2 and other station 7, which are related in a peer-to-peer relationship by the second wireless system B, approach the communication area 10 of the wireless base station 1 with which communication is desired and the main station 2 enters the area 10 that allows communication with wireless base station 1, the main station 2 becomes a relay station and relays communications between the other station 7 and wireless base station 1.

The mobile wireless terminal device (main station 2) transmits a check signal radio wave in order to identify other stations that exist in the periphery of the main station in accordance with the process flow of FIG. 11 at regular intervals for each of the first wireless system A and the second wireless system B, decodes a signal that is received from a peripheral mobile station by the first and second decoders 54 and 55 respectively and inputs the decoded signal to the router control portion 56, whereby the router control portion 56 is made aware of the peripheral terminals that are able to communicate in accordance with the wireless systems A, B respectively.

The router control portion 56 checks whether communication is possible by the second wireless system B, that is, whether a valid address of the wireless communication system B exists (step 801). If a valid address does not exist, the router control portion 56 continues the check, and, if a valid address exists, the router control portion 56 calls the other station 7, which is capable of communicating by the second wireless system B, and thus forms a peer-to-peer network. In the state of FIG. 8, a peer-to-peer network has already been formed.

If the second wireless terminal portion 52 receives information from the other station 7 by the second wireless system B in such a state, the second wireless terminal portion 52 inputs the received information to the router 57 and the second decoder 52. The router control portion 56 references the decoded destination address to check whether the received information is a relay request (step 802). If the destination for the information is the main station, the router control portion 56 determines that the information is to be outputted to the user side (step 803) and inputs routing control information RCI to the router 57 (step 804), whereupon the router 57 outputs the information outputted by the second wireless terminal portion 52 to the user side via the user interface 53.

If the received information is a request to relay information to the wireless base station of the system A area in step 702, the router control portion 56 determines that information is to be relayed from the second wireless system B to the first wireless system A (step 805) and then inputs routing control information RCI to router 57 and issues an instruction to relay the information to the wireless base station 1 of the first wireless system A to the first wireless terminal portion 51 (step 804). Further, although a case where the main station 2 is able to communicate with wireless base station 1 was described hereinabove, if communication is impossible, the relay request is disregarded.

As a result of the above process, router 57 routes information that is outputted by the second wireless terminal portion 52 to the first wireless terminal portion 51 and the first wireless terminal portion 51 calls and connects wireless base station 1 and relays information from mobile station 7 to wireless base station 1.

On the other hand, if the first wireless terminal portion 51 receives information by the first wireless system A from wireless base station 1, the first wireless terminal portion 51 inputs the received information to router 57 and the first decoder 51. The router control portion 56 then checks whether it is possible to communicate by the first wireless system A, that is, whether a valid address of the wireless communication system A exists (step 811). If a valid address does not exist, the router control portion 56 continues the check, and, if a valid address exists, the router control portion 56 references the decoded destination address to check whether the received information is a relay request (step 812). If the received information is not a relay request, the router control portion 56 determines that the received information is to be outputted to the user side (step 813) and inputs routing control information RCI to the router 57 (step 804), whereupon the router 57 outputs information that is outputted by the first wireless terminal portion 51 to the user side via the user interface 53.

If the received information is a request to relay information to the other station 7 of system B in step 812, the router control portion 56 determines that information is to be relayed from the first wireless system A to the second wireless system B (step 814) and then inputs routing control information RCI to router 57 and issues an instruction to the second wireless terminal portion 52 to relay information to the mobile station 7 of the second wireless system B (step 804). As a result of the above process, router 57 routes information that is outputted by the first wireless terminal portion 51 to the second wireless terminal portion 52 and the second wireless terminal portion 52 relays the information to the mobile station 7.

(J) Ninth Embodiment

FIG. 23 is a block diagram of the constitution of the mobile wireless terminal device of the ninth embodiment and the process flow of the main station 2 in FIG. 9. The same reference numerals have been assigned to the same parts as those of the first embodiment in FIG. 13. The ninth embodiment is an embodiment in which, as shown in FIG. 9, even when the relationship between the main station and the other station is the reverse of that of the eighth embodiment, information can be relayed to the wireless base station as a result of main station 2 issuing a relay request to the other station 7.

The router control portion 56 checks whether communication is possible by the second wireless system B, that is, whether a valid address of the wireless communication system B exists (step 901). If a valid address does not exist, the router control portion 56 continues the check, and, if a valid address exists, the router control portion 56 calls the other station 7, which is capable of communicating by the second wireless system B, and thus forms a peer-to-peer network. In the state of FIG. 9, a peer-to-peer network has already been formed.

In this state, if the second wireless terminal portion 52 receives information from the other station 7 by the second wireless system B, the second wireless terminal portion 52 inputs the received information to router 57 and the second decoder 52. The router control portion 56 references the decoded destination address to check whether the destination for the information is the main station (step 902). If the destination of the received information is the main station, the router control portion 56 determines that the received information is to be outputted to the user side, and inputs routing control information RCI to router 57, whereupon the router 57 outputs information that is outputted by the second wireless terminal portion 52 to the user side via the user interface 53 (step 903). If the destination address is an address of the first wireless system A or an address of the second wireless system B other than that of the main station, the received information is disregarded (steps 904, 905).

On the other hand, when user information is inputted via the user interface 53, the router control portion 56 references the destination address of the user information (step 906). If the destination is the mobile station of the second wireless system B, the router control portion 56 creates routing control information RCI for inputting the user information to the second wireless terminal portion 52 and inputs the routing control information RCI thus created to router 57. As a result, router 57 inputs user information to the second wireless terminal portion 52 and the second wireless terminal portion 52 transmits user information by the second wireless system B (step 907).

On the other hand, if the destination is an address of the wireless system A, the router control portion 56 references information on peripheral communication-enabled terminals to check whether a mobile station that is capable of communicating by the first wireless system A exists in the periphery (step 908). If such a mobile station does not exist, the router control portion 56 communicates the fact that communication is impossible to the user and terminates control (step 909). However, if mobile station 7 (FIG. 9), which is capable of communicating by the first wireless system A, exists in the periphery, the router control portion 56 creates routing control information RCI for inputting user information to the first wireless terminal portion 51 and then inputs the routing control information RCI thus created to router 57 and issues an instruction to the first wireless terminal portion 52 to transmit by relaying the other station 7. As a result of the above process, router 57 routes user information to the first wireless terminal portion 51 and the second wireless terminal portion 51 calls the other station 7 and issues a request to relay information to wireless base station 1 (step 910) before transmitting the user information to the wireless base station via the other station (step 911).

(K) Tenth Embodiment

FIG. 24 is a block diagram of the constitution of the mobile wireless terminal device of the tenth embodiment and the process flow of the main station 2 in FIG. 10. The same reference numerals have been assigned to the same parts as those of the third embodiment in FIG. 17. As shown in FIG. 10, the tenth embodiment is an embodiment in which, after the main station 2 in a group of wireless base stations in an autonomous distributed state from the main station 2 and the plurality of other stations 7 and 8 has moved into cell 10 with which communication is desired, the main station serves as a relay station while retaining the autonomous distributed state. The mobile wireless terminal device (main station 2) transmits a check signal radio wave in order to identify other terminals that exist in the periphery of the main station in accordance with the process flow in FIG. 11 at regular intervals for each of the first wireless system A, second wireless system B1, and third wireless system B2 and decodes a signal that is received from a peripheral mobile station by the first to third decoders 54, 55, and 62 respectively and inputs the decoded signal to the router control portion 56, whereby the router control portion 56 is made aware of the peripheral terminals that are able to communicate in accordance with the wireless systems A, B1 and B2 respectively.

The router control portion 56 checks whether communication is possible by the third wireless system B2, that is, whether a valid address of the wireless communication system B2 exists (step 1001). If a valid address does not exist, the router control portion 56 continues the check, and, if a valid address exists, the router control portion 56 calls the other station 8, which is capable of communicating by the third wireless system B2, and thus forms a peer-to-peer network. Similarly, the router control portion 56 checks whether communication is possible by the second wireless system B1, that is, whether a valid address of the wireless communication system B1 exists (step 1101). If a valid address does not exist, the router control portion 56 continues the check, and, if a valid address exists, the router control portion 56 calls the other station 7, which is capable of communicating by the second wireless system B1, and thus forms a peer-to-peer network. As a result of the above process, an adhoc network is formed by the terminals 2, 7, and 8.

If the third wireless terminal portion 61 receives information by the third wireless system B2 from the other station 8 in this state, the third wireless terminal portion 61 inputs the received information to router 57 and the third decoder 62. The router control portion 56 references the decoded destination address to check whether the information is a relay request (step 1002). If the destination for the information is the main station, the router control portion 56 determines that the information is to be outputted to the user side (step 1003) and inputs routing control information RCI to router 57 (step 1301), whereupon the router 57 outputs information that is outputted by the third wireless terminal portion 61 to the user side via the user interface 53.

In step 1002, if the destination address is an address of the second wireless system B1, the router control portion 56 determines that information is to be relayed from the third wireless system B2 to the second wireless system B1 (step 1004), and then inputs routing control information RCI to the router 57 and issues an instruction to the second wireless terminal portion 52 to relay information to the mobile station of the second wireless system B1 (1301). As a result of the above process, router 57 routes information that is outputted by the third wireless terminal portion 61 to the second wireless terminal portion 52 and the second wireless terminal portion 52 transmits the information by the second wireless system B1.

In step 1002, if the destination address is an address of the first wireless system A, the router control portion 56 determines that information is to be relayed from the third wireless system B2 to the first wireless system A (step 1005), and then inputs routing control information RCI to the router 57 and issues an instruction to the first wireless terminal portion 51 to relay information to the mobile station of the first wireless system A (1301). As a result of the above process, router 57 routes information that is outputted by the third wireless terminal portion 61 to the first wireless terminal portion 51 and the first wireless terminal portion 51 calls and connects wireless base station 1 and relays and transmits the received information to wireless base station 1.

If the second wireless terminal portion 52 receives information by the second wireless system B1, the second wireless terminal portion 52 inputs the received information to the router 57 and the second decoder 52. The router control portion 56 references the decoded destination address to check whether the information is a relay request (step 1102). If the destination of the information is the main station, the router control portion 56 determines that the information is to be outputted to the user side (step 1103) and inputs routing control information RCI to router 57 (step 1301), whereupon the router 57 outputs information that is outputted by the second wireless terminal portion 52 to the user side via the user interface 53.

In step 1102, if the destination address is an address of the third wireless system B2, the router control portion 56 determines that information is to be relayed from the second wireless system B1 to the third wireless system B2 (step 1104), and then inputs routing control information RCI to the router 57 and issues an instruction to the third wireless terminal portion 61 to relay information to the mobile station of the third wireless system B2 (1301). As a result of the above process, router 57 routes information that is outputted by the second wireless terminal portion 52 to the third wireless terminal portion 61 and the third wireless terminal portion 61 transmits the information by the third wireless system B2.

In step 1002, if the destination address is an address of the first wireless system A, the router control portion 56 determines that information is to be relayed from the second wireless system B1 to the first wireless system A (step 1105), and then inputs routing control information RCI to the router 57 and issues an instruction to the first wireless terminal portion 51 to relay information to the mobile station of the first wireless system A (1301). As a result of the above process, router 57 routes information that is outputted by the second wireless terminal portion 52 to the first wireless terminal portion 51 and the first wireless terminal portion 51 calls and connects wireless base station 1 and relays and transmits the received information to wireless base station 1.

Further, the router control portion 56 checks whether communication is possible by the first wireless system A, that is, whether a valid address of the first wireless communication system A exists (step 1201). If a valid address does not exist, the router control portion 56 continues the check, and, if a valid address exists, the router control portion 56 performs the following control.

That is, if the first wireless terminal portion 51 receives information by the first wireless system A, the first wireless terminal portion 51 inputs the received information to router 57 and the first decoder 51. The router control portion 56 references the decoded destination address to check whether the information is a relay request (step 1202). If the destination for the information is the main station, the router control portion 56 determines that the information is to be outputted to the user side (step 1203) and inputs routing control information RCI to router 57 (step 1301), whereupon the router 57 outputs information that is outputted by the first wireless terminal portion 51 to the user side via the user interface 53.

In step 1202, if the destination address is an address of the second wireless system B1, the router control portion 56 determines that information is to be relayed from the first wireless system A to the second wireless system B1 (step 1204), and then inputs routing control information RCI to the router 57 and issues an instruction to the second wireless terminal portion 52 to relay information to a mobile station of the second wireless system B1 (1301). As a result of the above process, router 57 routes information that is outputted by the first wireless terminal portion 51 to the second wireless terminal portion 52 and the second wireless terminal portion 52 relays and transmits the information by the second wireless system B1.

In step 1202, if the destination address is an address of the third wireless system B2, the router control portion 56 determines that information is to be relayed from the first wireless system A to the third wireless system B2 (step 1205), and then inputs routing control information RCI to the router 57 and issues an instruction to the third wireless terminal portion 61 to relay information to the mobile station of the third wireless system B2 (1301). As a result of the above process, router 57 routes information that is outputted by the first wireless terminal portion 51 to the third wireless terminal portion 61 and the third wireless terminal portion 61 transmits the information by the third wireless system B2.

The present invention hereinabove makes it possible to solve conventional problems by organically combining a plurality of wireless systems that are currently used or wireless systems that are expected to be used in the future. Although an example that adopts a wireless system in a Third Generation mobile phone system as the first wireless system and uses a mobile wireless system as the second wireless system was illustrated in the above embodiment, other wireless systems such as PHS, fixed wireless LAN, and Bluetooth communications, for example, can also be applied.

What is claimed is:

1. A mobile wireless terminal device configured as a main mobile wireless station, comprising:
    first wireless communication portion that is adapted for communicating mutually with a wireless base station in accordance with a first wireless system;
    second wireless communication portion that is adapted for communicating mutually with other mobile wireless station in accordance with a second wireless system;
    user interface portion that permits two-way user information transmission;
    first extraction portion for extracting control information from information that is received via the first wireless communication portion;
    second extraction portion for extracting control information from information that is received via the second wireless communication portion;
    a control portion for determining an operational policy on the basis of said control information that is extracted by the first and second extraction portion and the user information and for emitting routing control information on the basis of the operational policy; and
    a router for controlling the route of the information received via the first and second wireless communication portion and the user information on the basis of the routing control information.

2. The mobile wireless terminal device configured as a main mobile wireless station, according to claim 1, wherein the control portion:
    detects, when the main mobile wireless station is in a communication area of said wireless base station of the first wireless communication system, that other mobile wireless station comprising the second wireless communication portion has appeared within the communication area of the second wireless communication system of the main mobile wireless station and outside the communication area of the first wireless communication system; start communications with the other mobile wireless station by the second wireless communication portion in accordance with a request from the other mobile wireless station;

communicates with the wireless base station of the first wireless communication system and with the other mobile wireless station of the second wireless communication system simultaneously and controls the router to relay the communication content from the wireless base station of the first wireless communication system and the communication content from the other mobile wireless station of the second wireless communication system; and terminates relay control when the other mobile wireless station moves outside the communication area of the second wireless communication system of the main mobile wireless station or when there is a communication termination request from the other mobile wireless station.

3. The mobile wireless terminal device configured as a main mobile wireless station, according to claim 1, wherein the control portion: searches for another mobile wireless station comprising the first and second wireless communication portion in the communication area of the second wireless communication system when the main mobile wireless station moves outside the communication area of the wireless base station of the first wireless communication system, and, upon detecting the other mobile wireless station, issues a relay request to the other mobile wireless station and communicate with the wireless base station of the first wireless communication system by relaying the other mobile wireless station.

4. The mobile wireless terminal device configured as a main mobile wireless station, according to claim 3, comprising:

third wireless communication portion that permits a mutual wireless connection with a mobile wireless station in accordance with a third wireless system, wherein, when, in the course of communications with the wireless base station of the first wireless communication system by relaying said other mobile wireless station as the first other mobile wireless station, there is a request to relay communications to the wireless base station from a second other mobile wireless station comprising the third wireless communication portion that is outside the communication area of the second wireless communication system, the control portion relays information from the second other mobile wireless station to the first other mobile wireless station.

5. The mobile wireless terminal device configured as a main mobile wireless station, according to claim 1, wherein, when the main mobile wireless station exists outside the communication area of the wireless base station and moves into the communication area of the second wireless system of other mobile wireless station that exists in the communication area of the wireless base station, the control portion issues a relay request to the other mobile wireless station and communicates with the wireless base station of the first wireless communication system by relaying the other mobile wireless station; and, when the main mobile wireless station moves into the communication area of the first wireless communication system, the control portion communicates with the wireless base station by the first wireless communication portion.

6. The mobile wireless terminal device configured as a main mobile wireless station, according to claim 1, comprising:

a communication portion that, when the main mobile wireless station exists outside the communication area of the wireless base station and moves into the communication area of the second wireless system of the other mobile wireless station, communicates autonomously with the other mobile wireless station.

7. The mobile wireless terminal device configured as a main mobile wireless station, according to claim 1, wherein, when the main mobile wireless station exists outside the communication area of the wireless base station and moves into a communication area in which a plurality of other mobile wireless stations are autonomously communicating with each other by the second wireless system, the main mobile wireless station forms a network in which the main mobile wireless station communicates autonomously with the other mobile wireless stations.

8. The mobile wireless terminal device configured as a main mobile wireless station, according to claim 1, wherein, when the main mobile wireless station exists outside the communication area of the wireless base station and moves into a communication area in which a plurality of other mobile wireless stations that includes a station that is communicating with the main mobile wireless station are autonomously communicating with each other by the second wireless system, the main mobile wireless station forms a network in which the main mobile wireless station communicates with said plurality of other mobile wireless stations.

9. The mobile wireless terminal device configured as a main mobile wireless station, according to claim 1, wherein, when the main mobile wireless station exists outside the communication area of the wireless base station and moves into the communication area of the second wireless system of the other mobile wireless station, the main mobile wireless station forms a network in which the main mobile wireless station communicates with the other mobile wireless station autonomously; and, when the main mobile wireless station moves into the communication area of the wireless base station while communicating with the other mobile wireless station, the main mobile wireless station relays communications between said other mobile wireless station and wireless base station in accordance with a request from this mobile wireless station.

10. The mobile wireless terminal device configured as a main mobile wireless station, according to claim 1, wherein, when the main mobile wireless station exists outside the communication area of the wireless base station and moves into the communication area of the second wireless system of the other mobile wireless station, the main mobile wireless station forms a network in which the main mobile wireless station communicates with the other mobile wireless station autonomously; and, when said mobile wireless station moves into the communication area of the wireless base station while the main mobile wireless station is communicating with said other mobile wireless station, the main mobile wireless station asks said other mobile wireless station to relay communications between the main mobile wireless station and the wireless base station.

11. The mobile wireless terminal device configured as a main mobile wireless station, according to claim 1, wherein, when the main mobile wireless station exists outside the communication area of the wireless base station and forms a network in which the main mobile wireless station autonomously performs mutual communication with a plurality of other mobile wireless stations by a predetermined wireless system, upon moving into the communication area of the wireless base station while communicating with the other mobile wireless stations, the main mobile wireless station relays communications between said other mobile wireless stations and the wireless base station in accordance with requests from these mobile wireless station.

* * * * *